United States Patent
Shin et al.

(10) Patent No.: US 12,301,395 B2
(45) Date of Patent: *May 13, 2025

(54) METHOD AND APPARATUS FOR CONFIGURING DEMODULATION REFERENCE SIGNAL POSITION IN WIRELESS CELLULAR COMMUNICATION SYSTEM

(71) Applicant: Samsung Electronics Co., Ltd., Suwon-si (KR)

(72) Inventors: Cheolkyu Shin, Suwon-si (KR); Taehyoung Kim, Seoul (KR); Jinyoung Oh, Seoul (KR); Youngwoo Kwak, Suwon-si (KR); Seunghoon Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,537

(22) Filed: Dec. 1, 2023

(65) Prior Publication Data

US 2024/0097954 A1 Mar. 21, 2024

Related U.S. Application Data

(63) Continuation of application No. 17/478,388, filed on Sep. 17, 2021, now Pat. No. 11,838,158, which is a (Continued)

(30) Foreign Application Priority Data

Apr. 26, 2017 (KR) .................. 10-2017-0053659

(51) Int. Cl.
*H04L 27/26* (2006.01)
*H04L 5/00* (2006.01)
*H04W 72/0446* (2023.01)

(52) U.S. Cl.
CPC ........ *H04L 27/2602* (2013.01); *H04L 5/0048* (2013.01); *H04L 5/0051* (2013.01);
(Continued)

(58) Field of Classification Search
None
See application file for complete search history.

(56) References Cited

U.S. PATENT DOCUMENTS 9,930,649 B2    3/2018  Shi et al.
2013/0265955 A1  10/2013 Kim et al.
(Continued)

FOREIGN PATENT DOCUMENTS

CN    103716274 A    4/2014
CN    104081872 A    10/2014
(Continued)

OTHER PUBLICATIONS

Qualcomm Incorporated, 'Discussion on dl dmrs design', R1-1700806, 3GPP TSG-RAN WG1 NR Ad-Hoc Meeting, Jan. 16, 2017, Spokane, Washington, USA.
(Continued)

*Primary Examiner* — Robert M Morlan
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method by a terminal in a wireless communication system is provided. The method includes identifying a
(Continued)

slot type of a terminal from a first slot type and a second slot type, determining a position of a demodulation reference signal (DMRS) based on the slot type, and receiving the DMRS based on the position from a base station.

20 Claims, 18 Drawing Sheets

Related U.S. Application Data continuation of application No. 16/871,474, filed on May 11, 2020, now Pat. No. 11,128,506, which is a continuation of application No. 15/962,635, filed on Apr. 25, 2018, now Pat. No. 10,673,666.

(52) U.S. Cl.
CPC ........ *H04L 27/2613* (2013.01); *H04L 5/0007* (2013.01); *H04L 27/26025* (2021.01); *H04L 27/26035* (2021.01); *H04L 27/26136* (2021.01); *H04W 72/0446* (2013.01)

(56) References Cited

U.S. PATENT DOCUMENTS

| | | |
|---|---|---|
| 2015/0003356 A1 | 1/2015 | Seo et al. |
| 2015/0215085 A1 | 7/2015 | Xu et al. |
| 2016/0057753 A1 | 2/2016 | Yang et al. |
| 2016/0227521 A1 | 8/2016 | Han et al. |
| 2018/0227074 A1 | 8/2018 | Sun et al. |
| 2018/0279135 A1 | 9/2018 | Hwang et al. |
| 2019/0200332 A1 | 6/2019 | Hwang et al. |

FOREIGN PATENT DOCUMENTS

| | | |
|---|---|---|
| CN | 104144468 A | 11/2014 |
| CN | 104349491 A | 2/2015 |
| CN | 105981322 A | 9/2016 |
| CN | 106209331 A | 12/2016 |
| WO | 2014/098401 A1 | 6/2014 |

OTHER PUBLICATIONS

ETRI, 'Discussion for slot type indication', R1-1700580, 3GPP TSG RAN WG1 NR Ad Hoc Meeting, Jan. 16, 2017, Spokane, USA.
LG Electronics, 'Discussion on slot structure indication', R1-1704902, 3GPP TSG RAN WG1 Meeting #88bis, Apr. 3, 2017, Spokane, USA.
International Search Report dated Aug. 9, 2018, issued in International Application No. PCT/KR2018/004814.
Samsung, "DMRS design for URLLC", 3GPP Draft; R1-1705382, 3rd Generation Partnership Project (3GPP), Mobile Competence Centre; 650, Route Des Lucioles; F-06921 Sophia-Antipolis Cedex France, vol. RAN WG1, Spokane, USA, Apr. 3, 2017-Apr. 7, 2017, Apr. 2, 2017, XP051243512, Retrieved from the Internet: URL: http://www.3gpp.org/ftp/Meetings_3GPP_SYNC/RAN1/Docs/ [retrieved on Apr. 2, 2017].
Qualcomm Incorporated, "Discussion on DL DMRS design", 3GPP Draft; R1-1706440, 3rd Generation Partnership Project (3GPP), Mobile Competence Centre; 650, Route Des Lucioles; F-06921 Sophia-Antipolis Cedex; France, vol. RAN WG1, Spokane, USA, Apr. 3, 2017-Apr. 7, 2017, Apr. 9, 2017, XP051252684, Retrieved from the Internet: URL: http://www.3gpp.org/ftp/tsg_ran/WG1_RL1/TSGR1_88b/Docs/ [retrieved on Apr. 9, 2017].
ZTE et al., "Discussion on downlink DMRS design", 3GPP Draft; R1-1704411, Discussion on Downlink DMRS Design, 3rd Generation Partnership Project (3GPP), Mobile Competence Centre; 650, Route Des Lucioles; F-06921 Sophia-Antipolis Cedex; France, vol. RAN WG1, Spokane, USA, Apr. 3, 2017-Apr. 7, 2017, Apr. 2, 2017, XP051242558, Retrieved from the Internet: URL: http://www.3gpp.org/ftp/Meetings_3GPP_SYNC/RAN1/Docs/ [retrieved on Apr. 2, 2017].
Extended European Search Report dated Jan. 20, 2020, issued in European Patent Application No. 18790625.0.
3GPP, "Final Report of 3GPP TSG RAN WG1 #AH1_NR v1.0.", R1-1701553, 3GPP TSG RAN WG1 Meeting #88, Athens, Greece, Feb. 13-17, 2017.
3GPP, "Impact on eMBB DMRS Puncturing by URLLC Burst", R1-1705851, 3GPP TSG RAN WG1 Meeting #88bis, Spokane, USA, Apr. 3-7, 2017.
3GPP, "3rd Generation Partnership Project; Technical Specification Group Radio Access Network; Study on New Radio Access Technology Physical Layer Aspects (Release 14)", 3GPP TR38.802 v14.0.0 (Mar. 2017).
Korean Notification of a Decision to Grant a Patent dated Jul. 21, 2021, issued in Korean Patent Application No. 10-2017-0053659.
Chinese Office Action dated Dec. 9, 2021, issued in Chinese Patent Application No. 201880027711.4.
Chinese Notice of Allowance dated May 10, 2022, issued in Chinese Patent Application No. 201880027711.4.
LG Electronics, DL DMRS Design, R1-1702461, 3GPP TSG RAN WG1 Meeting #88, Feb. 7, 2017.
Qualcomm Incorporated, Discussion on DL DMRS design, R1-1702616, 3GPP TSG RAN WG1 Meeting #88, Feb. 7, 2017.
CATT, Discussion on DMRS design for DL, R1-1704561, 3GPP TSG RAN WG1 Meeting #88bis, Mar. 25, 2017.
Qualcomm Incorporated, Mini-slot design for URL, R1-1700829, 3GPP TSG-RAN WG1 NR Ad-Hoc, Jan. 10, 2017.
Chinese Office Action dated Apr. 15, 2024, issued in Chinese Patent Application No. 202210876985.9.

FIG. 9
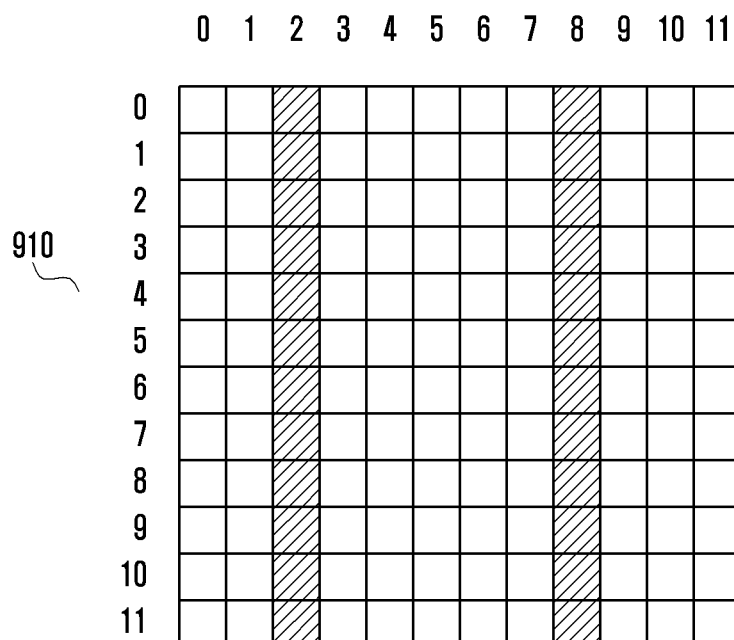
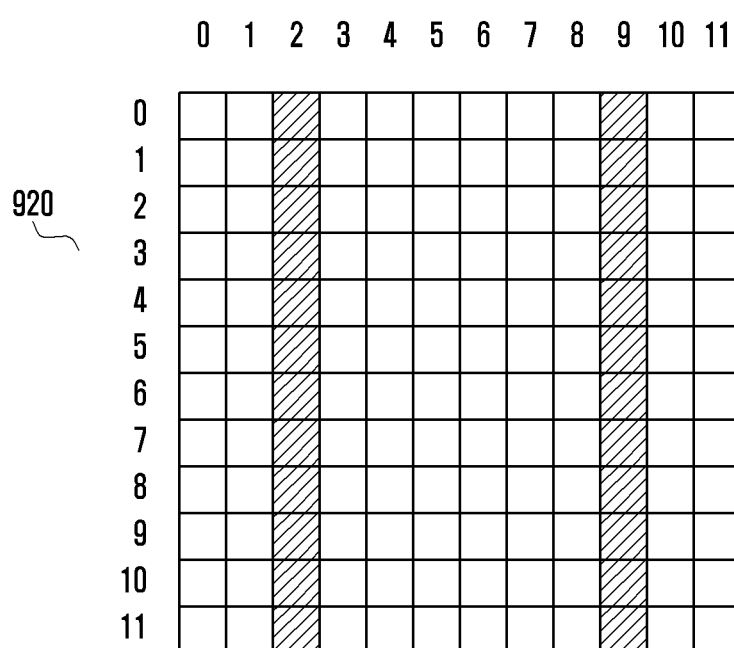

METHOD AND APPARATUS FOR CONFIGURING DEMODULATION REFERENCE SIGNAL POSITION IN WIRELESS CELLULAR COMMUNICATION SYSTEM

CROSS-REFERENCE TO RELATED APPLICATION(S)

This application is a continuation application of prior application Ser. No. 17/478,388, filed on Sep. 17, 2021, which has issued as U.S. Pat. No. 11,838,158 on Dec. 5, 2023; which is a continuation application of prior application Ser. No. 16/871,474, filed on May 11, 2020, which has issued as U.S. Pat. No. 11,128,506 on Sep. 21, 2021; which is a continuation application of prior application Ser. No. 15/962,635, filed on Apr. 25, 2018, which has issued as U.S. Pat. No. 10,673,666 on Jun. 2, 2020; and which is based on and claims priority under 35 U.S.C § 119(a) of a Korean patent application number 10-2017-0053659 filed on Apr. 26, 2017 in the Korean Intellectual Property Office, the disclosure of each of which is incorporated by reference herein in its entirety.

TECHNICAL FIELD

The disclosure relates to a wireless communication system. More particularly, the present disclosure relates to a method and an apparatus for configuring and indicating a position of a demodulation reference signal (DMRS).

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

On the other hand, there has been a need for a method for effectively transmitting a demodulation reference signal (DMRS) in various slot structures in the 5G wireless communication system.

The above information is presented as background information only to assist with an understanding of the disclosure. No determination has been made, and no assertion is made, as to whether any of the above might be applicable as prior art with regard to the disclosure.

SUMMARY

In a wireless communication system, in order for a terminal to estimate a channel, a base station (BS) should transmit a reference signal. The terminal may perform channel estimation using the reference signal, and may demodulate a received signal. Further, the terminal may grasp the channel state, and may use this to give feedback to the BS. In fifth generation (5G) wireless communication, unlike a long term evolution (LTE) system, front-loaded demodulation reference signal (DMRS) has been considered as a method for minimizing latency by shortening time required for data demodulation through fast channel estimation. Further, since the 5G wireless communication system supports various slot structures, there is a need for a method for configuring and indicating a position of the front-loaded DMRS for this. In this case, the position of the front-loaded DMRS exerts a great influence on the latency. In contrast, if the position of the front-loaded DMRS is dynamically changed according to circumstances to minimize the latency, it becomes difficult to manage DMRS interference in a synchronized network.

Aspects of the disclosure are to address at least the above-mentioned problems and/or disadvantages and to provide at least the advantages described below. Accordingly, an aspect of the disclosure is to provide an effective method for configuring a DMRS position in various slot structures.

In accordance with an aspect of the disclosure, a method of a terminal is provided. The method includes identifying a slot type of a terminal from a first slot type and a second slot type, determining a position of a DMRS based on the slot type, and receiving the DMRS based on the determined position from a base station.

In accordance with another aspect of the disclosure, a terminal is provided. The terminal includes a transceiver configured to transmit and receive a signal, and at least one processor configured to identify a slot type of a terminal from a first slot type and a second slot type, determine a position of a demodulation reference signal (DMRS) based on the slot type and control the transceiver to receive the DMRS based on the determined position from a base station.

In accordance with another aspect of the disclosure, a method of a BS is provided. The method includes transmitting a DMRS on a position in time domain to a terminal, wherein a slot type of the terminal is identified from a first slot type and a second slot type and the position of the DMRS is determined based on the slot type by the terminal.

In accordance with another aspect of the disclosure, a BS is provided. The BS includes a transceiver configured to transmit and receive a signal, and at least one processor configured to control the transceiver to transmit a DMRS on a position of a DMRS, wherein a slot type of a terminal is identified from a first slot type and a second slot type and the position of the DMRS is determined based on the slot type by the terminal.

As described above, the disclosure relates to a method and an apparatus for configuring and indicating a position of a DMRS. As the 5G wireless communication system supports various slot structures, there is a need for a method for configuring and indicating the position of the front-loaded DMRS. Through the provided method, the DMRS position can be effectively configured in various slot structures, and thus efficient transmission of radio resources becomes possible.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is a diagram illustrating a position of a DMRS according to an embodiment of the disclosure;

Throughout the drawings, it should be noted that like reference numbers are used to depict the same or similar elements, features, and structure.

DETAILED DESCRIPTION

Figure 1:
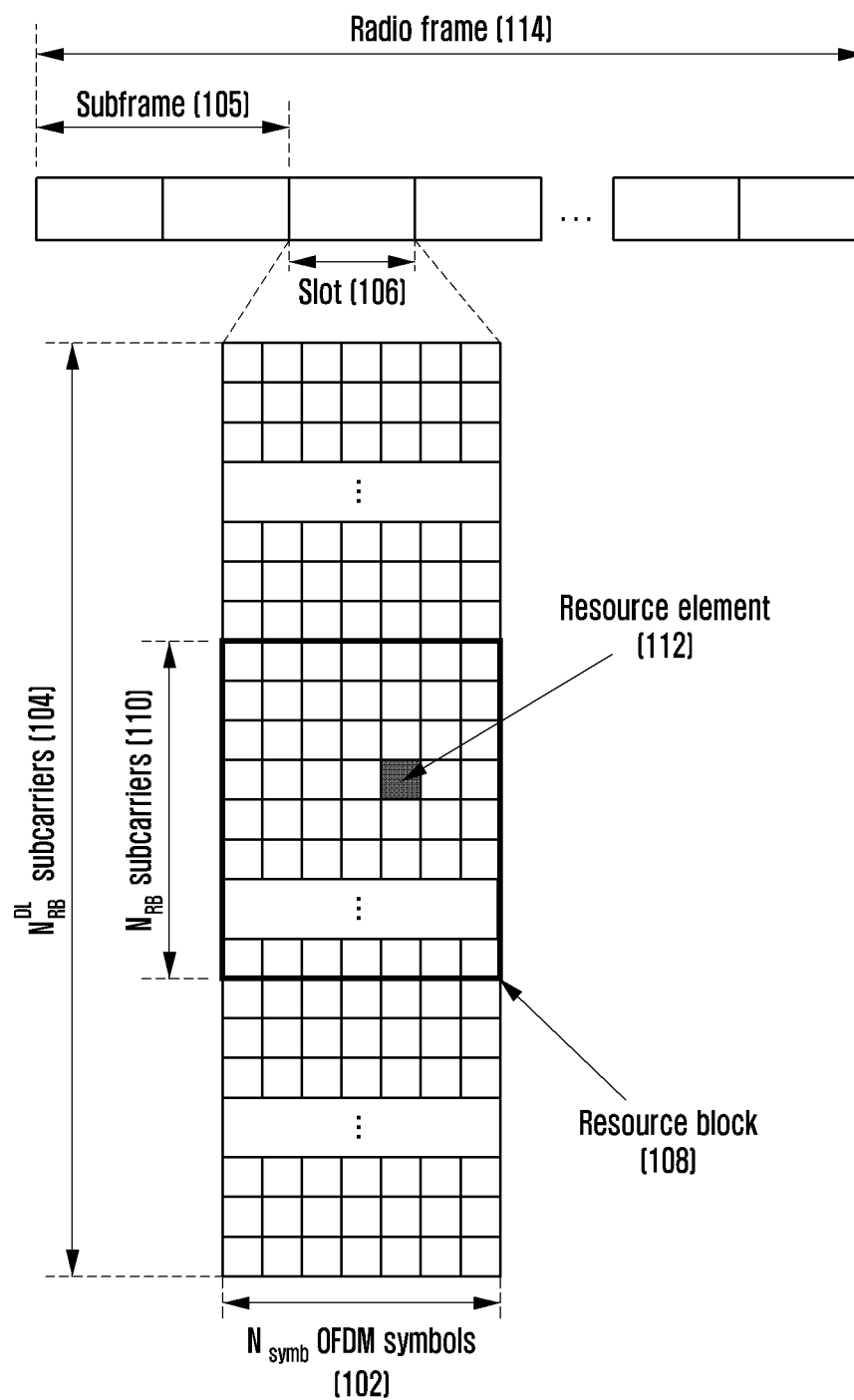
FIG. 1 is a diagram illustrating a basic structure of a time-frequency domain that is a radio resource region in which data or a control channel is transmitted on a downlink (DL) in a long term evolution (LTE)/LTE-advanced (LTE-A) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A wireless communication system was initially developed for the purpose of providing a voice-oriented service, but has been expanded to, for example, a broadband wireless communication system that provides a high-speed and high-quality packet data service like communication standards, such as third generation partnership project (3GPP) high speed packet access (HSPA), long term evolution (LTE) or evolved universal terrestrial radio access (E-UTRA), LTE-advanced (LTE-A), 3GPP2 high rate packet data (HRPD), ultra mobile broadband (UMB), and IEEE 802.16e. Further, as the 5th generation wireless communication system, fifth generation (5G) or new radio (NR) communication standards have been made.

In an LTE/LTE-A system that is a representative example of the broadband wireless communication systems, a downlink (DL) adopts an orthogonal frequency division multiplexing (OFDM) scheme, and an uplink (UL) adopts a single carrier frequency division multiple access (SC-FDMA) scheme. The UL means a radio link in which a terminal (or user equipment (UE)) or a mobile station (MS) transmits data or a control signal to a base station (BS) (or evolved node B (eNB)), and the DL means a radio link in which the BS transmits data or a control signal to the terminal. According to the above-described multiple access schemes, data of respective users or control information can be discriminated from each other by performing an allocation and an operation so as to prevent time-frequency resources for carrying the data or control information for each user from overlapping each other, that is, to establish orthogonality.

FIG. 1 is a diagram illustrating a basic structure of a time-frequency domain that is a radio resource region in which data or a control channel is transmitted on a DL in an LTE/LTE-A system according to an embodiment of the disclosure.

Referring to FIG. 1, a horizontal axis represents a time domain, and a vertical axis represents a frequency domain. In the time domain, the minimum transmission unit is an OFDM symbol, and Nsymb OFDM symbols 102 constitute one slot 106, and two slots constitute one subframe 105. The length of the slot is 0.5 ms, and the length of the subframe is 1.0 ms. Further, a radio frame 114 is a time domain region that is composed of 10 subframes. In the frequency domain, the minimum transmission unit is a subcarrier, and the transmission bandwidth (BW) of the whole system is composed of NBW subcarriers 104 in total.

In the time-frequency domain, the basic unit of resources is a resource element (RE) 112 that may be expressed by an OFDM symbol index and a subcarrier index. A resource block (RB) (or physical RB (PRB)) 108 is defined by Nsymb successive OFDM symbols 102 in the time domain and NRB successive subcarriers 110 in the frequency domain. Accordingly, one RB 108 is composed of NsymbxNRB REs 112. In general, the minimum transmission unit of data is an RB unit. In an LTE system, Nsymb=7, NRB=12, and NBW and NRB are in proportion to the bandwidth of the system transmission band. The data rate is increased in proportion to the number of RBs that are scheduled to the terminal. The LTE system may define and operate 6 transmission bandwidths. In the case of an FDD system that operates to discriminate between a DL and an UL by means of frequency, the DL transmission bandwidth and the UL transmission bandwidth may differ from each other. A channel bandwidth presents an RF bandwidth that corresponds to the system transmission bandwidth. Table 1 below presents the corresponding relationship between the system transmission bandwidth that is defined by the LTE system and the channel bandwidth. For example, the LTE system having a channel bandwidth of 10 MHz has the transmission bandwidth that is composed of 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Figure 2:
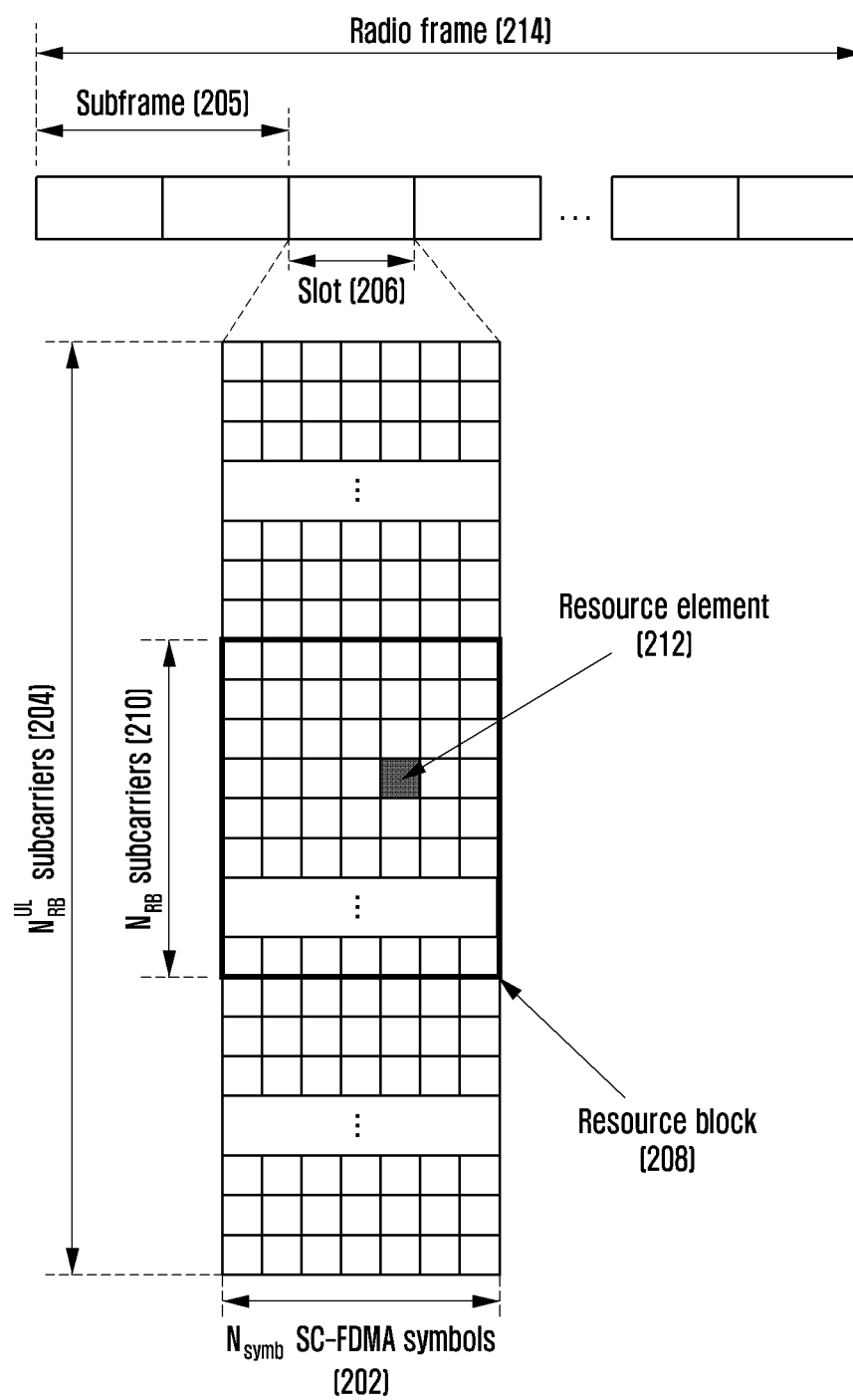
FIG. 2 is a diagram illustrating a basic structure of a time-frequency domain that is a radio resource region in which data or a control channel is transmitted on an uplink (UL) in an LTE/LTE-A system according to an embodiment of the disclosure.

FIG. 2 is a diagram illustrating a basic structure of a time-frequency domain that is a radio resource region in which data or a control channel is transmitted on an UL in an LTE/LTE-A system according to an embodiment of the disclosure.

Referring to FIG. 2, a horizontal axis represents a time domain, and a vertical axis represents a frequency domain. In the time domain, the minimum transmission unit is a SC-FDMA symbol 202, and NsymbUL SC-FDMA symbols may constitute one slot 206. Further, two slots constitute one subframe 205. In the frequency domain, the minimum transmission unit is a subcarrier, and the transmission bandwidth 204 of the whole system is composed of NBw subcarriers in total. NBw may have a value that is proportion to the system transmission bandwidth. Subcarriers 210 correspond to subcarriers 110 of FIG. 1, and radio frame 214 corresponds to radio frame 114 of FIG. 1.

In the time-frequency domain, the basic unit of resources is an RE 212 that may be defined by an SC-FDMA symbol index and a subcarrier index. An RB pair 208 is defined by $N_{symb}$UL successive SC-FDMA symbols in the time domain and NSCRB successive subcarriers in the frequency domain. Accordingly, one RB is composed of $N_{symb}$UL×$N_{sc}$RB REs. In general, the minimum transmission unit of data or control information is an RB unit. The PUCCH is mapped onto the frequency domain that corresponds to 1 RB, and is transmitted for one subframe.

Figure 3:
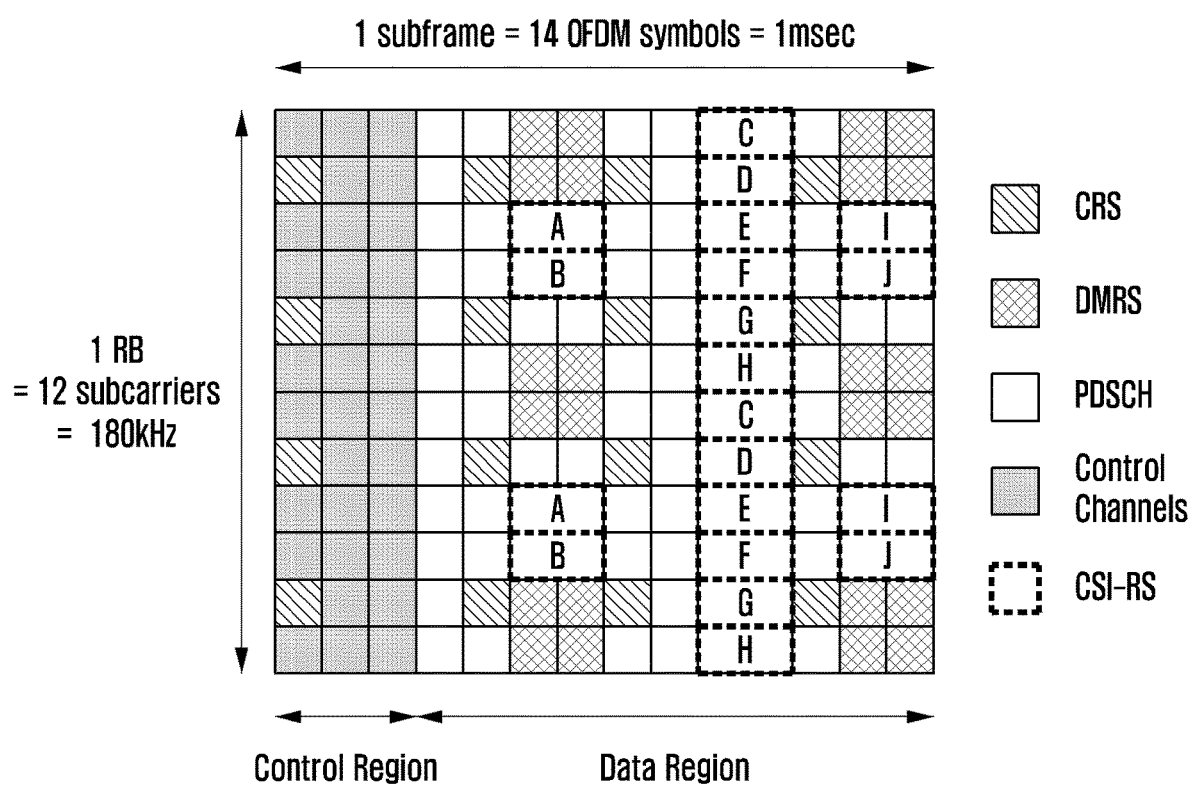
FIG. 3 is a diagram illustrating a radio resource of 1 resource block (RB) that is the minimum unit that can be DL-scheduled in an LTE/LTE-A system according to an embodiment of the disclosure.

FIG. 3 is a diagram illustrating a radio resource of 1 RB that is the minimum unit that can be DL-scheduled in an LTE/LTE-A system according to an embodiment of the disclosure. On the radio resource illustrated in FIG. 3, different kinds of signals may be transmitted as follows.

1. Cell specific reference signal (RS) (CRS): This is a reference signal periodically transmitted for all terminals belonging to one cell, and can be commonly used by a plurality of terminals.

2. Demodulation reference signal (DMRS): This is a reference signal transmitted for a specific terminal, and is transmitted only in case of transmitting data to the corresponding terminal. The DMRS may be composed of 8 DMRS ports in total. In LTE/LTE-A, ports 7 to 14 corresponding to DMRS ports, and the ports maintain orthogonality so that interference does not occur between them using a CDM or FDM.

3. Physical DL shared channel (PDSCH): This is a data channel transmitted to a DL, and is used by a BS to transmit traffic to a terminal. This is transmitted using an RE whereby a reference signal is not transmitted in the data region of FIG. 2.

4. Channel status information reference signal (CSI-RS): This is a reference signal transmitted for terminals belonging to one cell, and is used to measure the channel state. A plurality of CSI-RSs may be transmitted to one cell.

5. Other channels (physical hybrid automatic repeat request (ARQ) indicator channel (PHICH), physical control format indicator channel (PCFICH), and physical downlink control channel (PDCCH)): They are used to provide control information that is necessary for a terminal to receive the PDSCH, or to transmit acknowledgment/non-acknowledgment (ACK/NACK) to operate a hybrid-ARQ (HARQ) for UL data transmission.

In case of the DMRS among the above-described signals, as illustrated in FIG. 3, the position of the DMRS is fixed. However, unlike the LTE system, since various slot structures are supported in the 5G wireless communication, and thus the position of the DMRS may not be fixedly configured. More specifically, according to 3GPP RAN1 #86bis agreement, the slot of the 5G NR communication system is defined as follows.

For subcarrier spacing (SCS) of up to 60 kHz with null cyclic prefix (NCP), y=7 and 14
for further study (FFS): whether/which to down select for certain SCS(s)
For SCS of higher than 60 kHz with NCP, y=14

Here, y denotes a slot length represented by the number of OFDM symbols. In the agreement, the slot length y may be basically defined to include all possible DL centric/DL only/UL centric/UL only structures in the 5G NR communication system.

Figure 4:
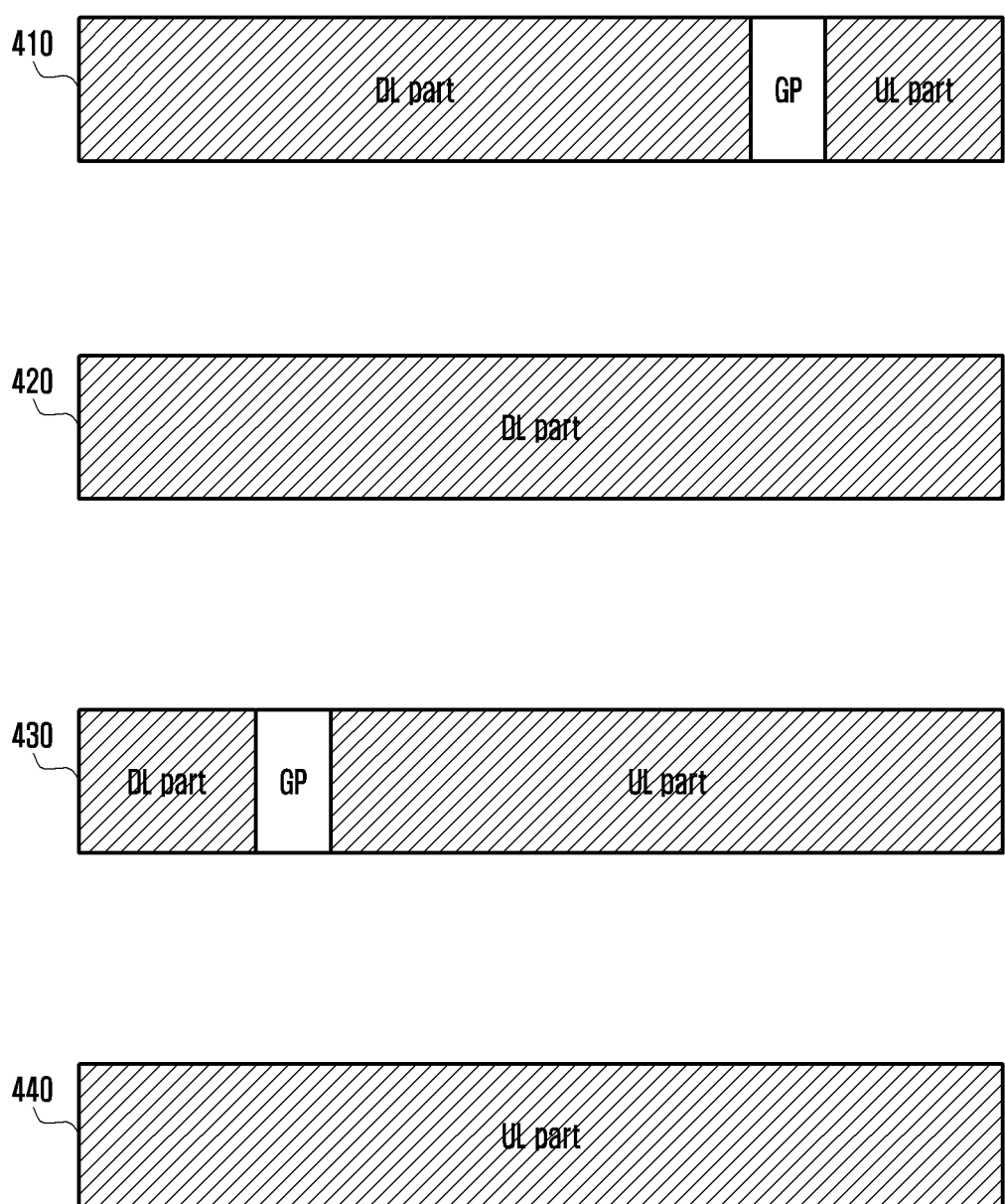
FIG. 4 is a diagram illustrating DL centric/DL only/UL centric/UL only structures as supportable slot structures in a fifth generation (5G) new radio (NR) system according to an embodiment of the disclosure.

FIG. 4 is a diagram illustrating DL centric/DL only/UL centric/UL only structures as supportable slot structures in a 5G NR system according to an embodiment of the disclosure.

Referring to FIGS. 4, 410, 420, 430, and 440 denote slot structures supportable in the 5G NR system, and the respective DL centric/DL only/UL centric/UL only structures are illustrated. In 410 and 430, a guard period (GP) is a time required during DL-UL conversion, and the required length may differ in accordance with a cell coverage or propagation delay. Further, according to 3GPP RAN1 #88bis agreement, the slot of the 5G NR communication system is defined as follows.

Specification supports data channel having minimum duration of 1 OFDM symbol of the data and starting at any OFDM symbol to below-6 GHz, in addition to above-6 GHz
Note: This may not be applied to all type of UEs and/or use-cases
UE is not expected to blindly detect the presence of DMRS or PT-RS
FFS: Whether a 1 symbol data puncturing can be indicated by preemption indication According to the agreement, the slot length of the 5G NR communication system may correspond to 1 to 14 OFDM symbols. Since various slot structures are supported in the 5G wireless communication as described above, a detailed operation method for this is necessary. For example, in case of y=14, the slot is defined by a basic slot, and may be defined as a slot structure supportable to all UEs. Further, in case of y that is smaller than 14, the slot is defined by a mini slot, and may be defined as a slot structure used for a specific use case, such as ultra-reliable low latency communications (URLLC).

Further, in the 5G wireless communication, front-loaded DMRS has been considered as a method for minimizing latency by shortening time required for data demodulation through fast channel estimation. More specifically, according to 3GPP RAN1 #88 agreement, the front-loaded DMRS of the 5G NR communication system is defined as follows.

Front-loaded DMRS is mapped over 1 or 2 adjacent OFDM symbols
NR aims for performance at least comparable to DM-RS of LTE in scenarios where applicable for both LTE and NR Further, according to 3GPP RAN1 #88bis agreement, the front-loaded DMRS of the 5G NR communication system may be defined as follows.

At least for slot, the position of front-loaded DL DMRS is fixed regardless of the first symbol position of PDSCH
FFS: Mini-slot case According to the agreement, the front-loaded DMRS is composed of one or two adjacent OFDM symbols, and in the basic slot structure, the position of the front-loaded DMRS is fixed regardless of the start position of the PDSCH. However, in the mini slot, it is not determined whether the position of the front-loaded DMRS is fixedly configured or is dynamically changed. According to 3GPP RAN1 discussions for the current NR system, it is noted that accurate definition of the slot has not been made. Accordingly, wordings of the basic slot and the mini slot may not be separately defined. However, based on the agreement below, explanation may be made on the assumption that a case corresponding to that described below is called the basic slot, and a case not corresponding to that described below is called a slot that is not the basic slot.

For SCS of up to 60 kHz with NCP, y=7 and 14
FFS: whether/which to down select for certain SCS(s)
For SCS of higher than 60 kHz with NCP, y=14

Based on the above-described assumption, the basic slot may be used as the basic structure that can be supported by all UEs. If the position of the DMRS is dynamically changed in consideration of a synchronized network, it becomes difficult to manage DMRS interference. According to the current agreement, the position of the front-loaded DMRS is fixed regardless of the start position of the PDSCH. If the position of the front-loaded DMRS is fixed, the DMRS cannot be positioned on a front side in spite of a short PDCCH region, and thus it is inefficient for the purpose of minimization of the latency. However, in case of a non-basic slot, it has a slot structure used in a specific use case, and in consideration of the synchronized network, it is not greatly motivated to fixedly configure the position of the DMRS regardless of the start position of the PDSCH. On the contrary, it may be rather advantageous to shorten the time required for data demodulation through channel estimation by positioning the front-loaded DMRS maximally on the front side. Accordingly, the disclosure provides a method for effectively configuring a DMRS position with respect to various slot structures supported in the 5G wireless communication system.

Hereinafter, an embodiment of the disclosure will be described in detail with reference to the accompanying drawings. Although an embodiment of the disclosure is described in a state where an LTE or LTE-A system is exemplified, it is also possible to apply the embodiment of the disclosure even to other communication systems having similar technical backgrounds or channel types. For example, the 5th generation mobile communication technologies (5G and NR) that are developed after the LTE-A may be included therein. More specifically, the basic structure of the time-frequency domain in which signals are transmitted on the DL and UL may differ from those illustrated in FIGS. 1 and 2. Further, different kinds of signals may be transmitted on the DL and UL. Accordingly, the embodiment of the disclosure may also be applied to other communication systems through partial modifications thereof in a range that does not greatly deviate from the scope of the disclosure by the judgment of those skilled in the art.

Further, in describing the disclosure, a detailed description of related functions or configurations will be omitted if it is determined that it obscures the subject matter of the disclosure in unnecessary detail. Further, all terms to be described later are terms defined in consideration of functions of the disclosure, and may differ depending on intentions of a user or an operator or customs. Accordingly, they should be defined on the basis of the contents of the whole description of the disclosure. Hereinafter, the BS is the subject that performs resource allocation to the terminal, and may be at least one of an eNB, Node B, BS, radio connection unit, BS controller, and node on a network. The terminal may include UE, MS, cellular phone, smart phone, computer, or a multimedia system capable of performing a communication function. In the disclosure, a DL is a radio transmission path of a signal that is transmitted from the BS to the terminal, and an UL means a radio transmission path of a signal that is transmitted from the terminal to the BS.

Hereinafter, the DMRS to be described is a reference signal that is transmitted through UE-specific precoding and has a feature that the UE can demodulate the signal even without additionally receiving precoding information, and uses the same name as that used in the LTE system. However, the term "DMRS" may be expressed by another term in accordance with the user's intention and the use purpose of the reference signal. For example, it may be expressed by another term, such as UE-specific RS or dedicated RS. More specifically, the term "DMRS" is presented merely as a specific example for easy explanation of the technical contents of the disclosure and to help understanding of the disclosure, and it is apparent to those of ordinary skill in the art to which the disclosure pertains that the above-described operation can be embodied through other terms based on the technical concept of the disclosure.

In a first embodiment of the disclosure to be described hereinafter, a method for determining a DMRS position in a basic slot structure in which only DL or UL exists will be described. In a second embodiment, a method for determining a DMRS position with respect to a basic slot structure in which only DL or UL exists will be described. In a third embodiment, a method for determining a DMRS position with respect to a non-basic slot structure in which only DL or UL exists will be described. In a fourth embodiment, a method for determining a DMRS position with respect to a basic slot structure in which DL and UL exist at the same time will be described.

First Embodiment

In a first embodiment, a method for determining a DMRS position in a basic slot structure in which only DL or UL exists will be described. As described above, according to 3GPP RAN1 discussions for the current NR system, accurate definition of a slot has not been made. In the first embodiment, the following case is defined as a basic slot based on 3GPP RAN1 #86bis agreement.

For SCS of up to 60 kHz with NCP, y=7 and 14
FFS: whether/which to down select for certain SCS(s)
For SCS of higher than 60 kHz with NCP, y=14

Accordingly, with respect to a case where a subcarrier interval is equal to or smaller than 60 kHz, the length of a basic slot may be configured as y=7 or y=14. Further, with respect to a case where the subcarrier interval is larger than 60 kHz, the length of the basic slot may be configured as y=14. Accordingly, in the first embodiment, a method for determining a DMRS position for the basic slot structure with respect to a subframe in which only DL exists through the definition of the slot structure is provided. First, with respect to the subframe in which only DL exists, the DMRS position in the basic slot structure may be determined by an area occupied by a control channel region. A control format indicator (CFI) serves to indicate how many OFDM symbols a control channel is composed of. In the 5G communication system, the CFI may be configured in the following method.

Alt-1: radio resource control (RRC) configuration
Alt-2: configuration by group common downlink control information (DCI)

The Alt-1 is a method for semi-statically configuring CFI information, and Alt-2 is a method for dynamically configuring CFI information similarly to the LTE system. In the 5G communication system, it is possible to configure the CFI information in the above-described method. Further, the DMRS position in the basic slot structure with respect to a subframe in which only DL exists through the configured CFI may be configured as follows.

$$\text{Max(CFI)}+1 \qquad \text{Equation 1}$$

The method for configuring the DMRS position according to Equation 1 has a feature that the DMRS position is fixed regardless of the start position of the PDSCH. In the 5G communication system, a plurality of DMRS structures can be configured. As an example for this, a configurable DMRS structure may be divided into a front-loaded DMRS and an extended/additional DMRS. Specifically, the front-loaded DMRS is a DMRS that is positioned on the front side of an NR-PDSCH for fast data decoding, and may be composed of one or two adjacent OFDM symbols. Accordingly, Equation 1 may indicate the position of the front-loaded DMRS.

Figure 5:
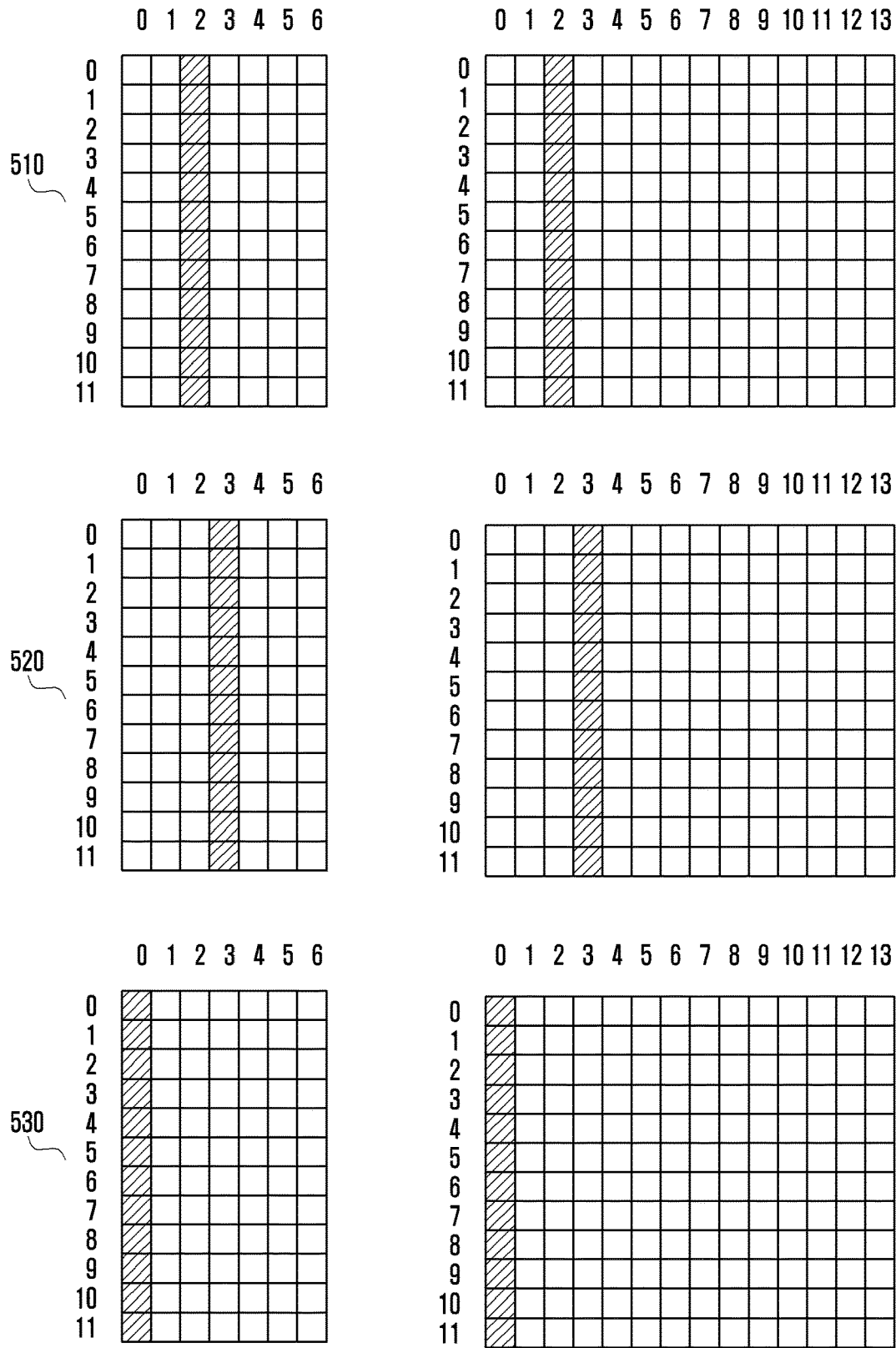
FIG. 5 is a diagram illustrating a position of front-load demodulation reference signal (DMRS) if a slot length corresponds to 7 or 14 orthogonal frequency division multiplexing (OFDM) symbols according to an embodiment of the disclosure.

FIG. 5 is a diagram illustrating a position of front-load DMRS if a slot length corresponds to 7 or 14 OFDM symbols according to an embodiment of the disclosure.

Here, the position configuration of the front-loaded DMRS may be determined by the control channel region. If the CFI is 2 at maximum, the front-loaded DMRS is positioned at the third OFDM symbol as shown as 510. If the CFI is 3 at maximum, the front-loaded DMRS is positioned at the fourth OFDM symbol as illustrated as 520. If the position of the front-loaded DMRS is determined by the control channel region that can be maximally configured, there may be a loss in reducing the decoding latency due to the DMRS position that is always configured at a fixed position in case where a part or the whole of the control channel is not configured. Accordingly, in the disclosure, as an extended method, a method capable of configuring the position of another front-loaded DMRS is provided. For example, if the CFI is 2 at maximum, an option for fixing the front-loaded DMRS to the first OFDM symbol as illustrated as 530 may be configured in addition to the configuration for fixing the front-loaded DMRS to the third OFDM symbol as illustrated as 510. Further, according to circumstances, if the two options are configured, the drawback that the position of the front-loaded DMRS is fixed can be remedied. Specifically, there may be various methods for configuring the position of one or more front-loaded DMRSs. For example, a method for semi-statically configuring the position of the front-loaded DMRS through an upper layer signaling such as an RRC may be considered. As another method, the position of the front-loaded DMRS may be configured in system information such as master information block (MIB) or system information block (SIB). Further, a method for dynamically configuring the position of the front-loaded DMRS through a medium access control (MAC) control element (CE) or DCI. Unlike this, it is also possible to configure the position of the front-loaded DMRS through semi-persistent scheduling (SPS).

Next, an extended/additional DMRS will be described. According to the front-loaded DMRS as described above, it is not possible to track a fast time-varying channel in a high Doppler situation, and it is difficult to accurately estimate the channel. Further, it is not possible to perform correction of a frequency offset only with the front-loaded DMRS. For this reason, it is necessary to transmit an additional DMRS at the rear of the position where the front-loaded DMRS is transmitted in a slot.

Figure 6A:
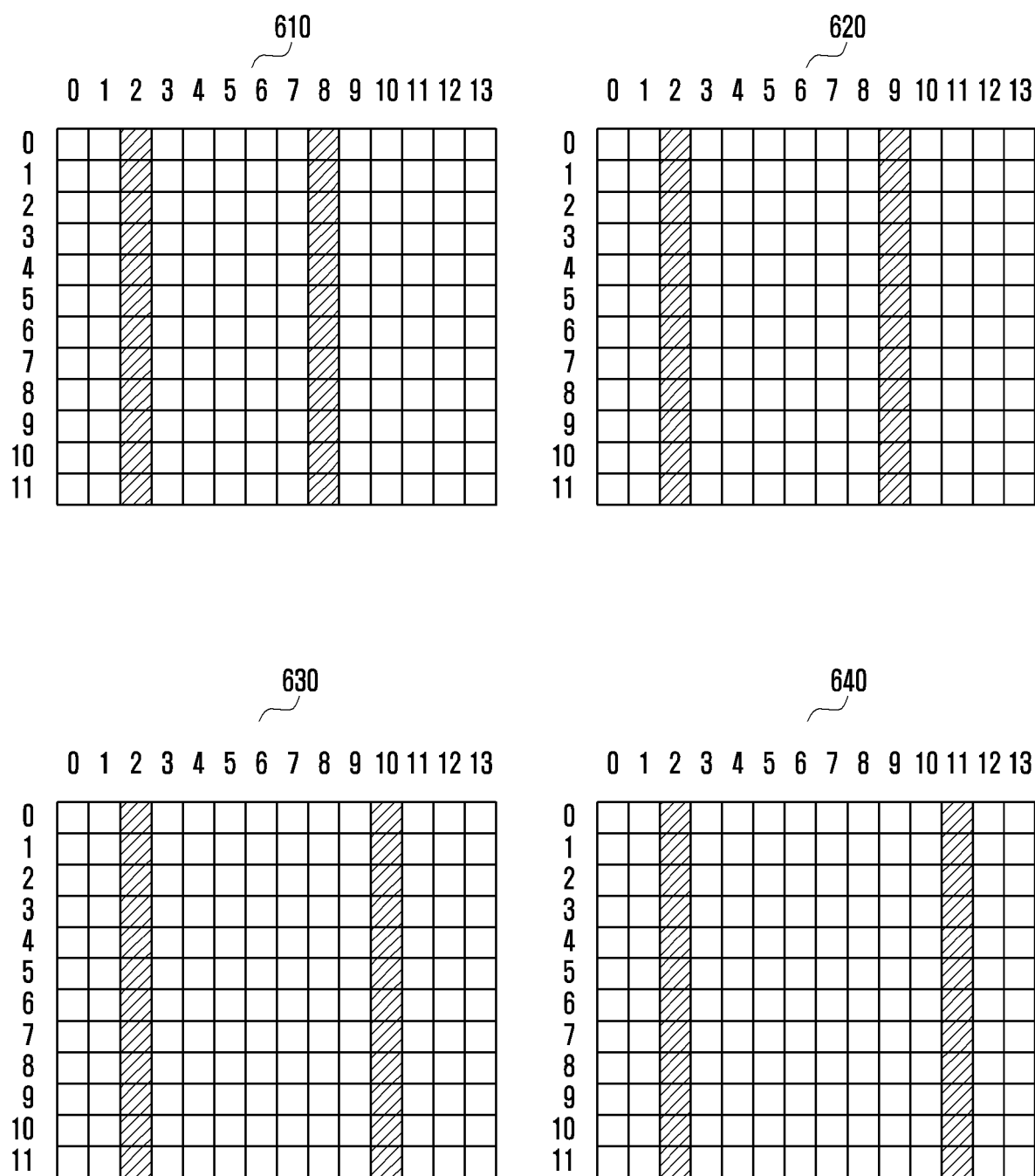
FIGS. 6A, 6B, and 6C are diagrams illustrating a position where one additional extended/additional DMRS is transmitted in case of 14 OFDM symbols according to various embodiments of the disclosure.
Figure 6B:
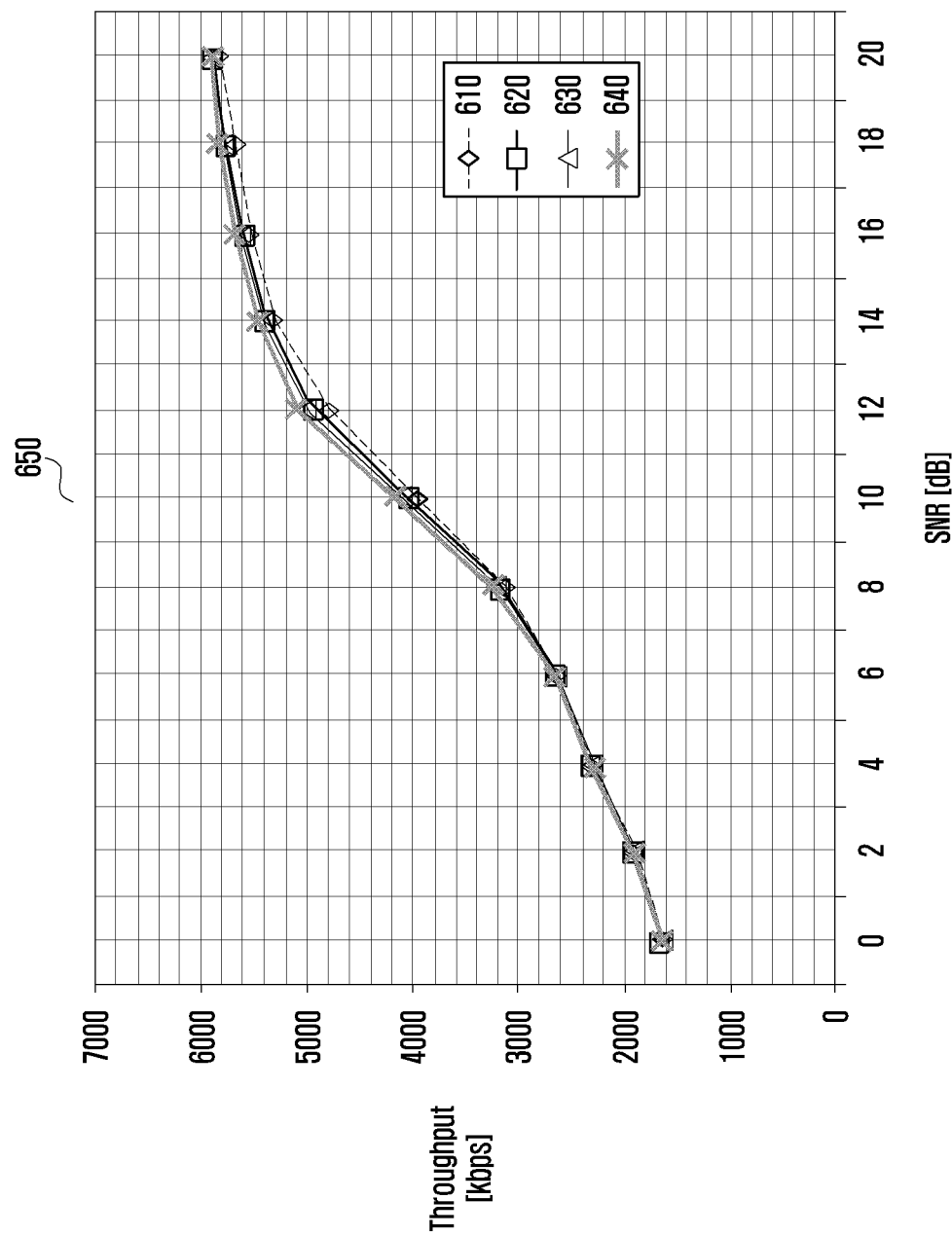
Figure 6C:
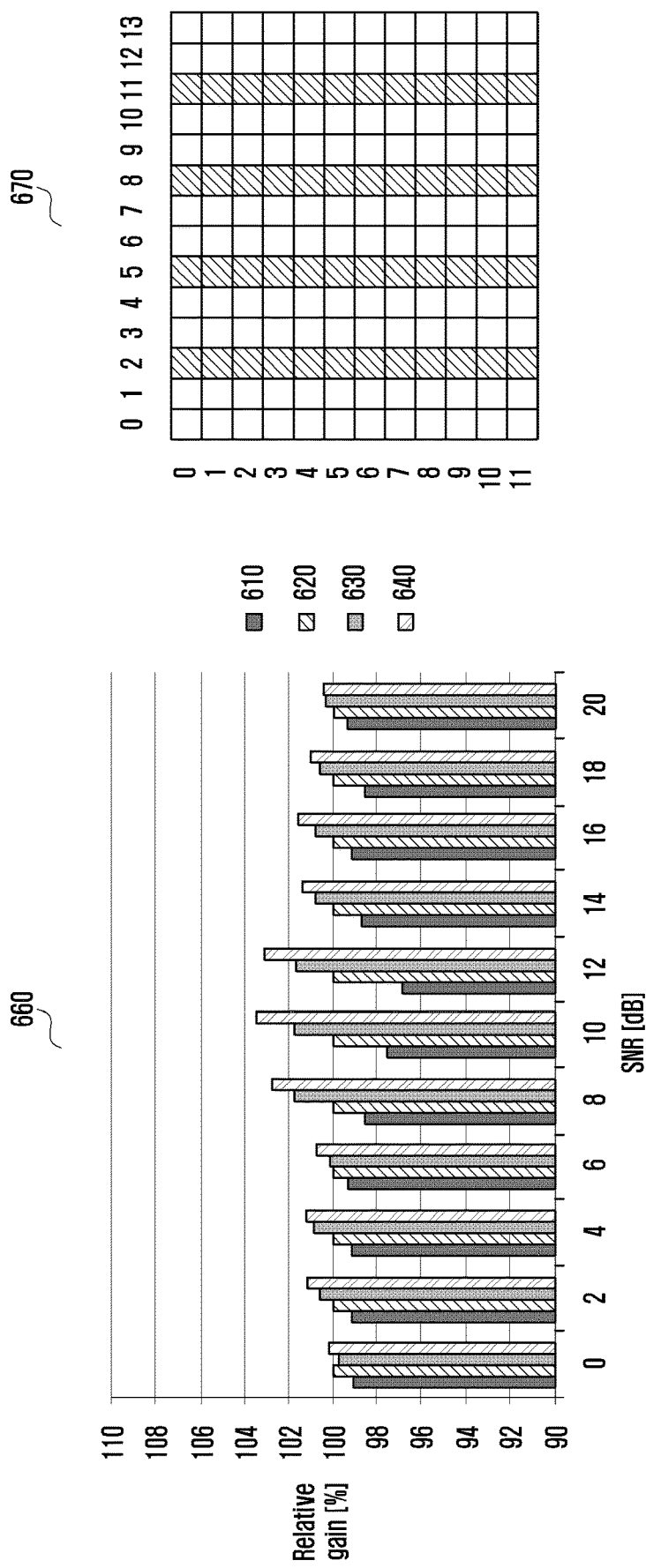

FIGS. 6A, 6B, and 6C are diagrams illustrating a position where one additional extended/additional DMRS is transmitted in case of 14 OFDM symbols according to various embodiments of the disclosure.

First, each position in which one additional extended/additional DMRS is transmitted is illustrated through 610, 620, 630, and 640 of FIGS. 6A, 6B, and 6C in case of 14 OFDM symbols. Referring to FIGS. 6A to 6C, it is considered that maximally 2 DL control regions as 510 in FIG. 5 are configured, and OFDM symbol positions 12 and 13 are excluded from candidates considering that they can be used for GP and UL in a slot structure in which DL and UL exist at the same time. Further, through experiments, throughput performance for 610 to 640 is illustrated as 650. As the result of the experiments, it can be observed that the performance is improved as one additional extended/additional DMRS is subsequently transmitted. Based on this, if one extended/additional DMRS is added, it may be a good alternative of 640 on the side of the throughput performance. However, as the DMRS is positioned in the rear, the time required for data demodulation is shortened through fast channel estimation, and this may cause a drawback on the side of the latency minimization. Accordingly, in consideration of the throughput performance and the latency based on the result of the experiments, the following selection may be considered.

Alt-1: 610—latency is preferentially considered
Alt-2: 640—Throughput is preferentially considered
Alt-3: 620—Tradeoff between throughput and latency is considered.

In case of Alt-3, if the structure of 620 is selected through 660, relative throughput is reduced to 103% or less as compared with 640, and the position is configured to avoid the position in which CRS is transmitted in an LTE system. Accordingly, in the LTE-NR coexistence situation, it has the advantage against the interference influence. Further, Alt-3 may be a good alternative in configuring the DMRS position that is not different from the slot structure considered in a second embodiment below. If the slot length corresponds to 14 OFDM symbols, two or more extended/additional DMRS positions are necessary according to the Doppler situation. For example, in a fast channel changing environment in a state where the subcarrier spacing is 15 kHz, it is necessary to configure 4 extended/additional DMRS positions such as 670. The DMRS position of 670 corresponds to a structure in which two last symbols are emptied in consideration of the slot structure in which DL and UL exist at the same time and the DMRS is positioned maximally symmetrically. In all embodiments of the disclosure, temporal positions in which DMRSs are configured based on one OFDM symbol are illustrated. For example, it is to be noted that DMRS transmitting positions can be additionally configured if two adjacent OFDM symbols are necessary for antenna port extension. Further, in the disclosure, DMRS patterns applied to temporal positions for sending the DMRSs are not limited. In the disclosure, the temporal positions for the DMRS sending are focused, but the applied DMRS patterns are not limited. For example, in an embodiment of the disclosure, all or partial REs of the DMRS sending symbols may be used as the DMRSs.

Figure 7A:
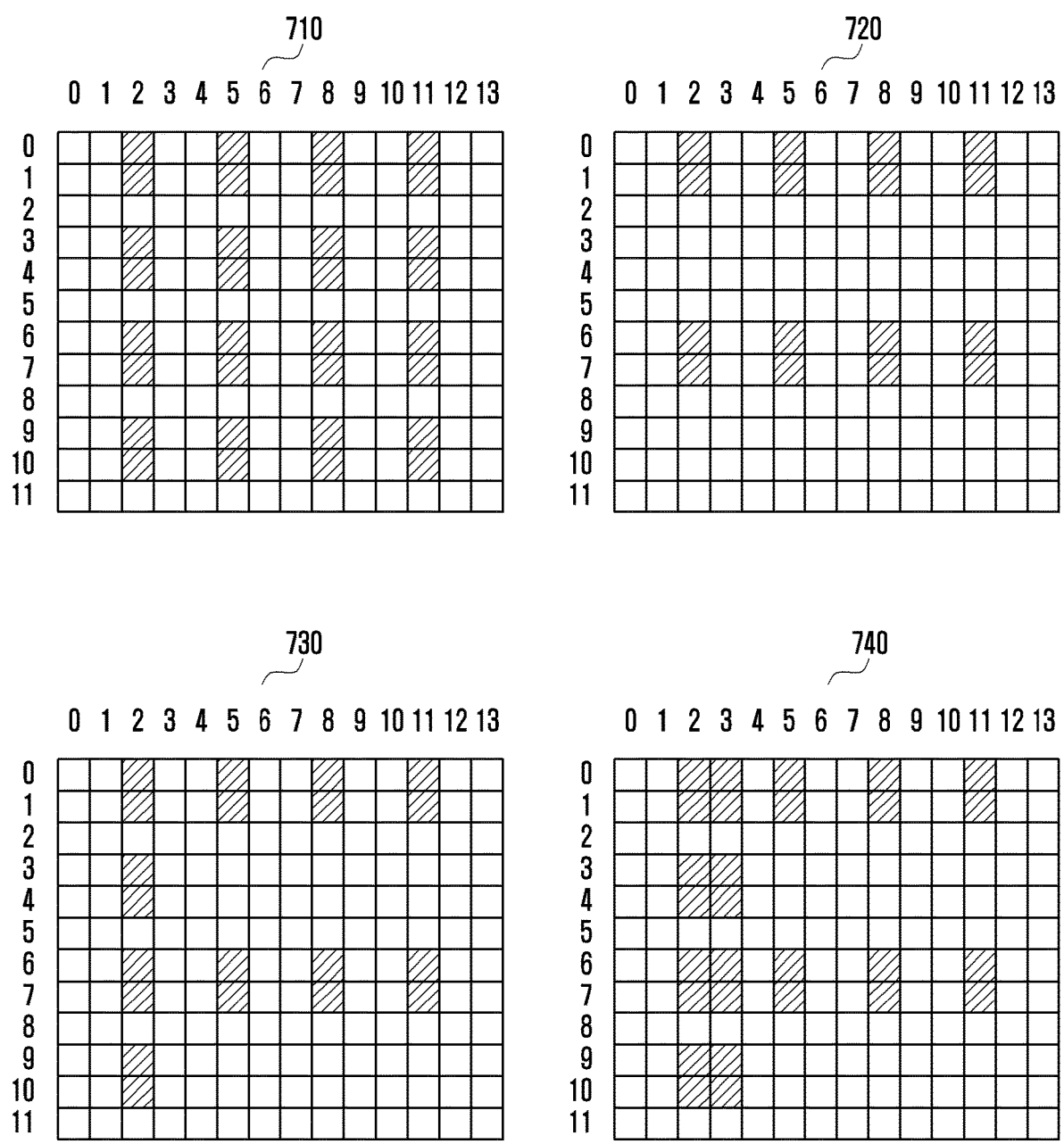
FIGS. 7A, 7B, and 7C are diagrams illustrating a DMRS pattern according to various embodiments of the disclosure.
Figure 7B:
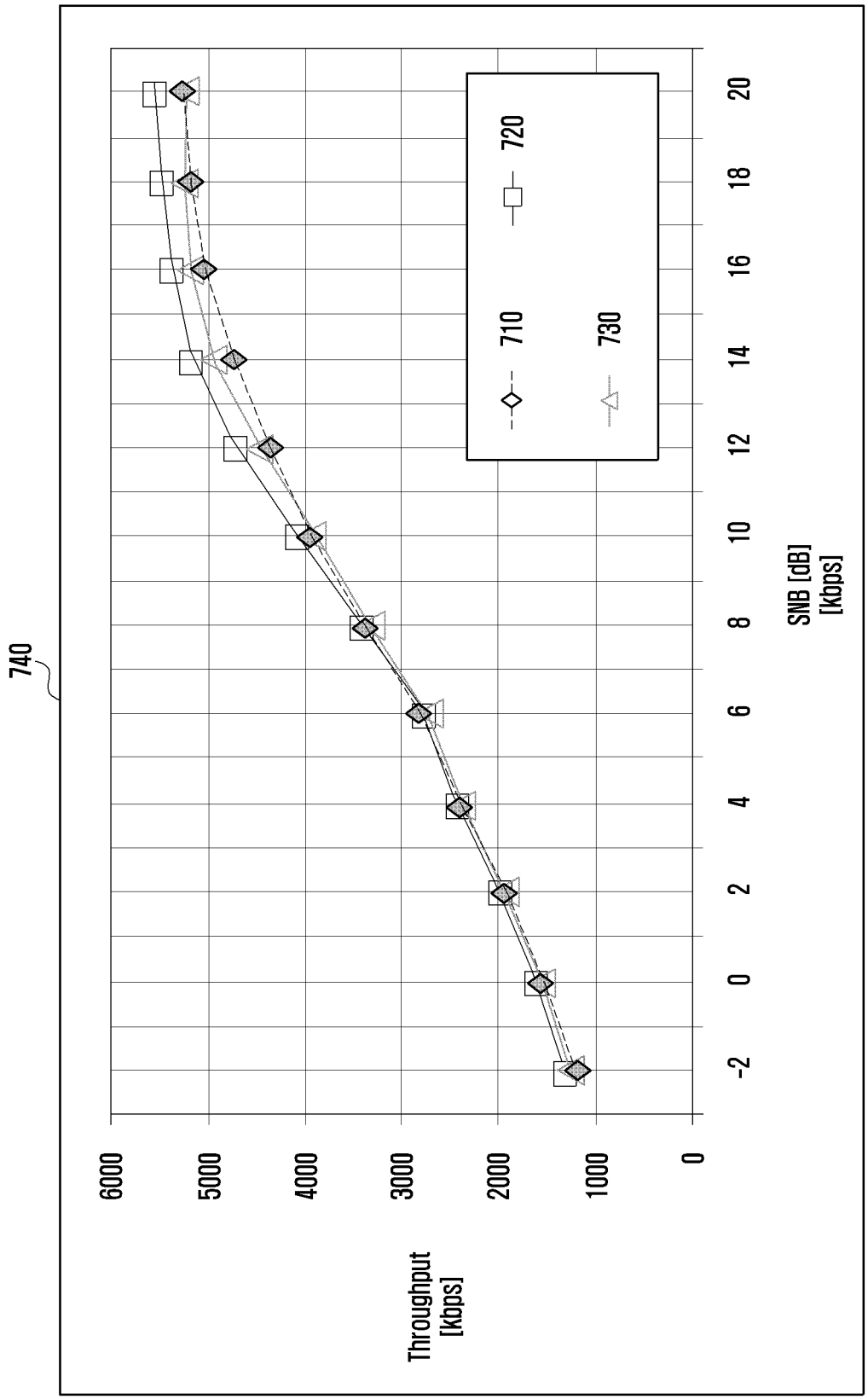
Figure 7C:
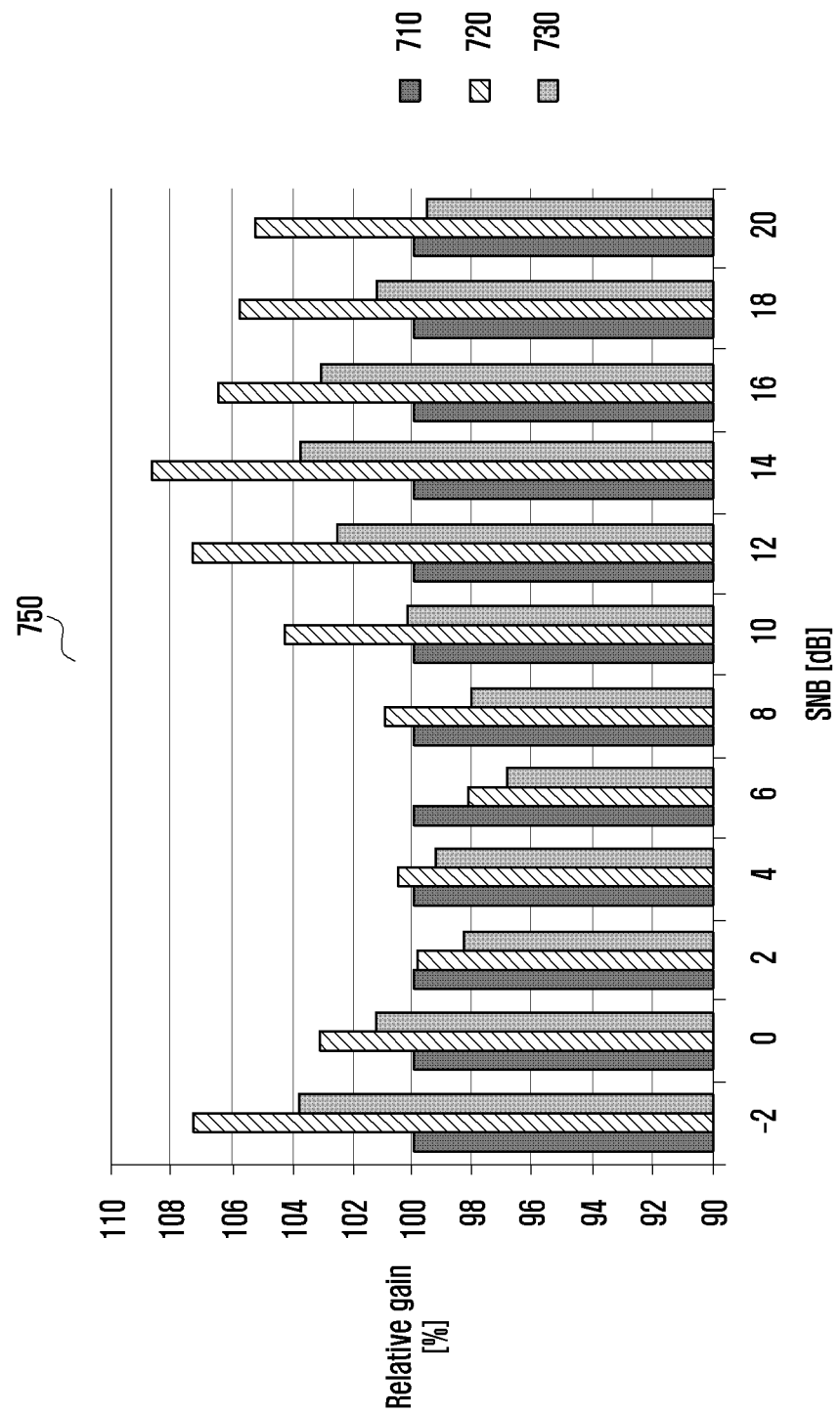

FIGS. 7A, 7B, and 7C are diagrams illustrating a DMRS pattern according to various embodiments of the disclosure.

For example, DMRS patterns of FIGS. 7A to 7C may be used. In addition, in case of the extended/additional DMRSs, a plurality of DMRSs are temporally configured, and thus DMRS overhead problems may occur. In this case, it is possible to reduce the DMRS overhead by configuring the DMRS having low density on frequency. For example, in case of 720 of FIGS. 7A to 7C, more effective transmission can be performed by configuring the DMRSs having low density on frequency in consideration of high DMRS density that 710 has. More specifically, the throughput performance and relative gain are illustrated in 740 and 750 with respect to methods 720 and 730 for configuring DMRSs having low density on frequency. As the result of experiments, in case of configuring the extended/additional DMRSs, it can be observed that configuration of the front-loaded DMRS and the extended/additional DMRS at the same low density on frequency as 720 shows a better performance than the performance of the configuration of them at different densities on frequency as 730. Accordingly, the extended/additional DMRS may be configured to have the same density as that of the front-loaded DMRS. However, in consideration of MU-MIMO for a high-speed terminal and a low-speed terminal, the disclosure may use the following DMRS configuration method.

The UE may assume the density for additional DMRS is same for number of transmission layers less than equal to X and reduced otherwise.

In the method as described above, X denotes a parameter determining the DMRS density on frequency of the front-loaded DMRS and the extended/additional DMRS, and may be configured as the transmission layer number of 2 or 4. The above-described method is a method to enable a low-speed terminal to perform high-rank transmission, and as illustrated as 760 of FIGS. 7A to 7C, in accordance with X, the front-loaded DMRS and the extended/additional DMRS may be configured at different DMRS densities on frequency.

Although the DMRS position has been provided around DL, it is possible to configure the DMRS in the same position with respect to UL in order for DL and UL to support a common DMRS structure. If the DL and UL have the common DMRS structure, it may be easy to control interference through orthogonal DMRS port allocation between UL and DL in an environment such as a dynamic TDD.

Hereinafter, a method by a BS for configuring a DMRS structure in consideration of a point that the DMRS structure becomes diversified according to the disclosure will be described. It is to be noted that the following method for configuring a DMRS structure can be applied to other embodiments.

TABLE 2 dd-- ASN1START
DMRS-timeDensityId ::= INTEGER (0..maxDMRS-Time
DMRS-frequencyDensityId ::= INTEGER (0..maxDMRS-Freqeuncy)
-- ASN1STOP Specifically, it is possible to indicate a temporally extended RS structure through DMRS-timeDensityId in table 2. Here, maxDMRS-Time denotes the number of maximally configurable DMRS-timeDensityIds. For example, it may be used to configure a temporally extended RS structure, such as a front-loaded RS and an extended/additional DMRS. Last, in table 2, different RS densities on frequency can be configured through the DMRS-frequencyDensityId. Here, maxDMRS-Frequency denotes the maximally configurable number of DMRS-frequencyDensityIds. For example, it may be used to configure a low RS density on frequency in order to adjust RS overhead. It is to be noted that the term for configured field values in table 2 can be replaced by another term. The terms used herein are only for the purpose of presenting specific examples to facilitate explanation of the technical contents of the disclosure and to help understanding of the disclosure, but are not intended for limiting the scope of the disclosure. That is, it is apparent to those of ordinary skill in the art to which the disclosure belongs that the above-described operations can be embodied through other terms based on the technical idea of the disclosure. More specifically, through the above-described method, the DMRS structure can be semi-statically configured through RRC, and a terminal can grasp the structure of the currently transmitted DMRS through the value configured in the RRC. Next, a method by a BS for dynamically configuring a DMRS structure suitable to a transmission environment will be described. If the DMRS information is configured in a MAC CE in a similar method to the method for configuring the DMRS information in the RRC, it is possible to configure the information on the DMRS structure more dynamically. Next, the simplest method for dynamically configuring the DMRS structure is to put the information on the DMRS structure in the DCI to be transmitted. In this case, for a basic operation, a DCI format to which a field for dynamically operating the DMRS structure is not applied may be separately defined. If the DMRS structure is configured using the DCI, it becomes possible to dynamically change the DMRS structure. In contrast, a DCI overhead may occur during the operation of the DMRS structure. Since it may not be necessary to change the different DMRS patterns on time and frequency as fast as dynamic signaling is necessary to cope with the time-frequency channel change as in table 2, it may be more preferable to configure the DMRS structure in the RRC.

Second Embodiment

In a second embodiment, a method for determining a DMRS position in a basic slot structure in which only DL or UL exists will be described. In the first embodiment, it is assumed that a terminal is configured as a normal CP, whereas in the second embodiment, it is assumed that the terminal is configured as an extended CP (ECP). If the terminal is configured as the extended CP, the following case is defined as a basic slot based on 3GPP RAN1 #88bis agreement.
  For 60 kHz ECP in the case with WA will be confirmed
  One slot consists of 6 or 12 OFDM symbols
  If down selection of NCP will be appeared between 7 or 14 OFDM symbols, RAN1 will also apply the down selection of ECP between 6 or 12 OFDM symbols
  Accordingly, if a subcarrier interval is 60 kHz, the length of a basic slot with respect to the ECP may be configured as y=6 or y=12. Accordingly, in the second embodiment, if the terminal is configured as the extended CP through definition of the slot structure, a method for determining a DMRS position with respect to the structure of a basic slot in which only DL or UL exists is provided. In the same manner as the method provided in the first embodiment, the position of the front-loaded DMRS may be determined from Equation 1 through the configured CFI. Further, by additionally configuring the positions of one or more front-loaded DMRSs, the drawback that the position of the front-loaded DMRS is always fixed and a loss may occur in reducing the decoding latency can be remedied.

Figure 8:
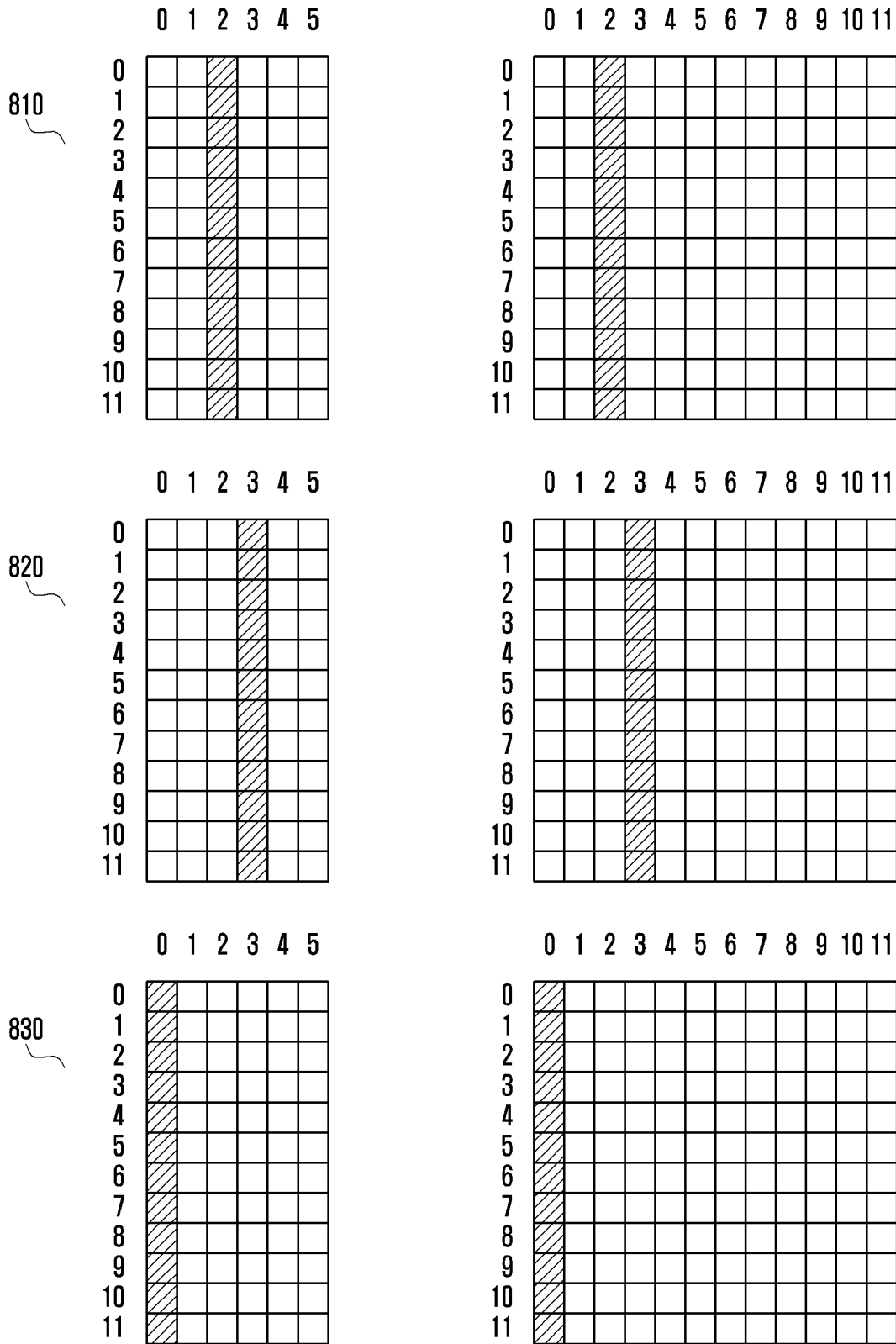
FIG. 8 is a diagram illustrating a position of front-loaded DMRS if a length of a basic slot is configured to y=6 or y=12 with respect to an extended cyclic prefix (CP) (ECP) in case where a subcarrier interval is 60 kHz according to an embodiment of the disclosure.

FIG. 8 is a diagram illustrating a position of front-loaded DMRS if a length of a basic slot is configured to y=6 or y=12 with respect to an ECP in case where a subcarrier interval is 60 kHz according to an embodiment of the disclosure.

Referring to FIG. 8, if the length of the basic slot is configured as y=6 or y=12 in a state where the subcarrier interval is 60 kHz, the positions of the front-loaded DMRSs by Equation 1 are illustrated as 810 and 820 of FIG. 8, and configuration of the position of the additional front-loaded DMRS is illustrated as 830. Further, in the same manner as the first embodiment, it is not possible to track the fast time-varying channel in the high Doppler situation. Accordingly, it is difficult to accurately estimate the channel. Further, it is not possible to perform correction of the frequency offset only with the front-loaded DMRS. For this reason, it is necessary to transmit an additional DMRS at the rear of the position where the front-loaded DMRS is transmitted in a slot. If the subcarrier interval is 60 kHz, as compared with the case where the subcarrier interval is 15 kHz, the OFDM symbol interval is reduced to ¼. Accordingly, two or more extended/additional DMRSs may not be necessary to track the fast time-varying channel as in the first embodiment. Accordingly, in the same manner as the first embodiment, it is considered that maximally 2 DL control regions are configured, and the two last OFDM symbols positions 12 and 13 are excluded from candidates considering that they can be used for GP and UL in the slot structure in which DL and UL exist at the same time. Based on this, the following selection may be considered.
  Alt-1: 910—latency is preferentially considered
  Alt-2: 920—Throughput is preferentially considered
  Based on the result of experiments of the first embodiment, Alt-1 may be the position in which the latency is preferential, and Alt-2 may be the position in which the throughput is preferential.

Although the DMRS position has been provided around DL, it is possible to configure the DMRS in the same position even with respect to UL in order for DL and UL to support a common DMRS structure. If the DL and UL have the common DMRS structure, it may be easy to control interference through orthogonal DMRS port allocation between UL and DL in an environment such as a dynamic TDD.

Third Embodiment

In a third embodiment, a method for determining a DMRS position in a basic slot structure in which only DL or UL exists will be described. According to 3GPP RAN1 discussions for the current NR system, it is to be noted that accurate definition of a slot has not been made. Accordingly, terms of a basic slot and a mini slot currently discussed in 3GPP RAN1 may not be separately defined. In the first embodiment, the following case is defined as a basic slot based on 3GPP RAN1 #86bis agreement.
  For SCS of up to 60 kHz with NCP, y=7 and 14
  FFS: whether/which to down select for certain SCS(s)
  For SCS of higher than 60 kHz with NCP, y=14
  According to the third embodiment, with respect to a case where a subcarrier interval is equal to or smaller than 60 kHz, the length of a basic slot may be configured as y=7 or y=14. Unlike this, in case of a non-basic slot, it is possible to discriminate the slot in the following method. In an NR system, the non-basic slot may be called a mini slot.

Alt-1: Discriminated by a symbol length
Alt-2: Discriminated by a PDCCH monitoring period Specifically, according to Alt-1, if the length of the basic slot is configured as y=7 with respect to a case where the subcarrier interval is equal to or smaller than 60 kHz, a case where the length of the basic slot is configured to be smaller than y=7 may be defined as the non-basic slot. Unlike this, if the length of the basic slot is configured as y=14, a case where the length of the basic slot is configured to be smaller than y=14 may be defined as the non-basic slot. Further, if the length of the slot is configured to be smaller than y=14 with respect to a case where the subcarrier interval is larger than 60 kHz, this case may be defined as the non-basic slot. Unlike this, according to Alt-2, the non-basic slot can be discriminated by a PDCCH monitoring period. For example, if the PDCCH monitoring period is configured to X in case of the basic slot, a case where the slot having the PDCCH monitoring period that is smaller than X may be defined as the non-basic slot. More specifically, if the slot is composed of one OFDM symbol, the PDCCH monitoring may be performed for each OFDM symbol.

As described above, in the third embodiment, a method for determining a DMRS position for the non-basic slot with respect to a subframe in which only DL exists through the definition of the slot structure is provided. In case of the basic slot, it may be used as the basic structure supported by all UEs. If the position of the DMRS is dynamically changed in consideration of a synchronized network, it becomes difficult to manage DMRS interference. However, if the position of the front-loaded DMRS is fixed, the DMRS cannot be positioned on a front side in spite of a short PDCCH region, and thus it is inefficient for the purpose of minimization of the latency. However, in case of a non-basic slot, such as a mini slot, it has a slot structure used in a specific use case, and in consideration of the synchronized network, it is not greatly motivated to fixedly configure the position of the DMRS regardless of the start position of the PDSCH. It may be rather advantageous to shorten the time required for data demodulation through channel estimation by positioning the front-loaded DMRS maximally on the front side. Accordingly, in consideration of this, the disclosure provides a method for configuring a DMRS position for a non-basic slot with respect to a subframe in which only DL exists as follows.

Alt-1: The DMRS position is determined by a data starting position indicator.
Alt-2: The DMRS position is determined by TCFI and slot symbol duration.

FIG. 9 is a diagram illustrating a position of a DMRS according to an embodiment of the disclosure.

Of the disclosed methods, Alt-1 is a method for configuring a DMRS position by a data starting position indicator newly defined in a 5G NR communication system, and is a method for determining that the front-loaded DMRS is positioned in a data starting position indicated by the data starting position indicator. In the 5G NR communication system, the data starting position indicator may be dynamically configured or may be semi-statically configured.

Figure 10:
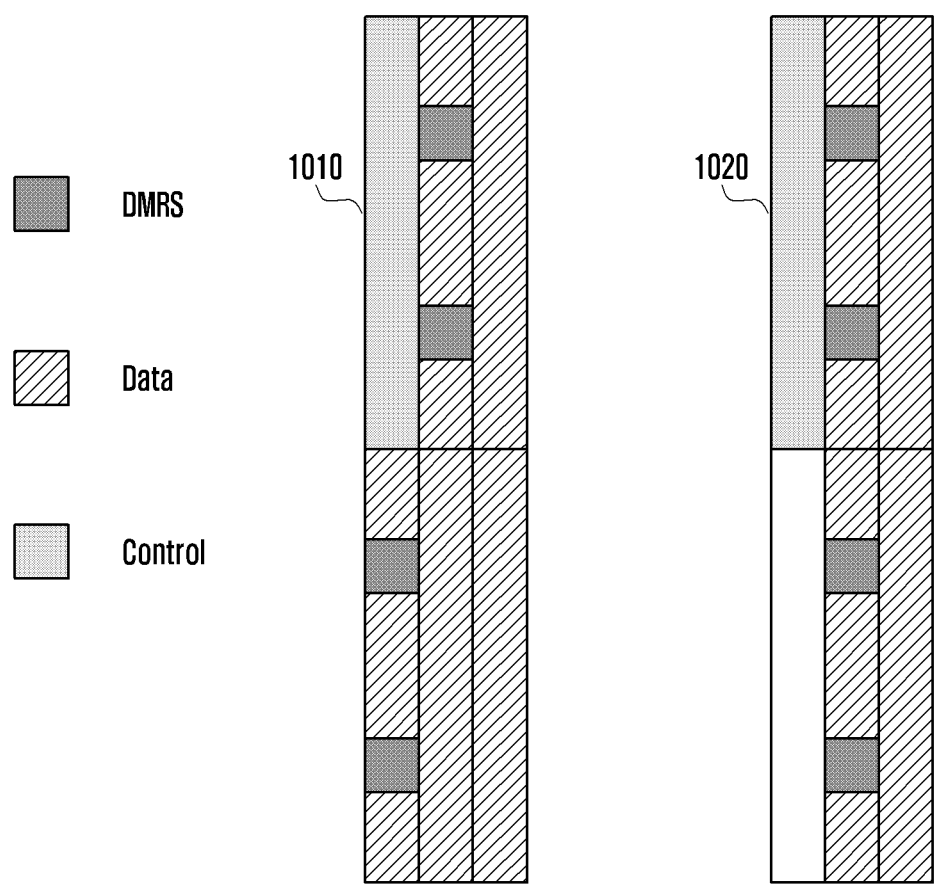
FIG. 10 is a diagram explaining a method for configuring a DMRS position by a data starting position indicator according to an embodiment of the disclosure.

FIG. 10 is a diagram explaining a method for configuring a DMRS position by a data starting position indicator according to an embodiment of the disclosure.

More specifically, the Alt-1 method will be described in detail through FIG. 10. An example of a slot structure composed of 3 OFDM symbols is illustrated in FIG. 10, and DMRS, data, and control channel are illustrated with different colors. If a plurality of data starting position indicators can be configured in the 5G NR communication system, it is also possible to configure the position of the front-loaded DMRS as 1010 of FIG. 10. Since the plurality of data starting position indicators are supported, data transmission is possible from the foremost OFDM symbol in case where a control region does not exist in a specific RB, and it is possible to locate the front-loaded DMRS therein. Unlike this, if only one data starting position indicator can be configured in the 5G NR communication system, it is possible to configure the position of the front-loaded DMRS as 1020. In this case, as illustrated as 1020, if there is not a control region in a specific RB, data transmission from the foremost OFDM symbol becomes impossible, and the position of the front-loaded DMRS may be configured at a data start position indicated by one data starting position indicator. In accordance with the method for configuring the data starting position indicator of Alt-1, the position of the front-loaded DMRS may be dynamically or semi-statically configured. Unlike this, Alt-2 is a method for determining a DMRS position by CFI and slot symbol duration. More specifically, the position of the front-loaded DMRS may be determined through the following equation.

$$\text{Min}(\text{Max}(\text{CFI})+1, \text{slot duration}) \quad \text{Equation 2}$$

In Equation 2, the position of the front-loaded DMRS is determined by the CFI and the slot symbol duration. In Equation 2, the slot duration is a value configured in case where the slot length is smaller than max (CFI). For example, if the slot is composed of one symbol, the front-loaded DMRS is positioned at the first OFDM symbol regardless of the CFI. Equation 2 may be divided into two different methods according to the CFI value. The first method is a method for determining the CFI value as a value configured by a control resource set (CORESET). In this case, it is not necessary to perform signaling of additional information on the CFI value configured in the CORESET to the terminal.

Figure 11:
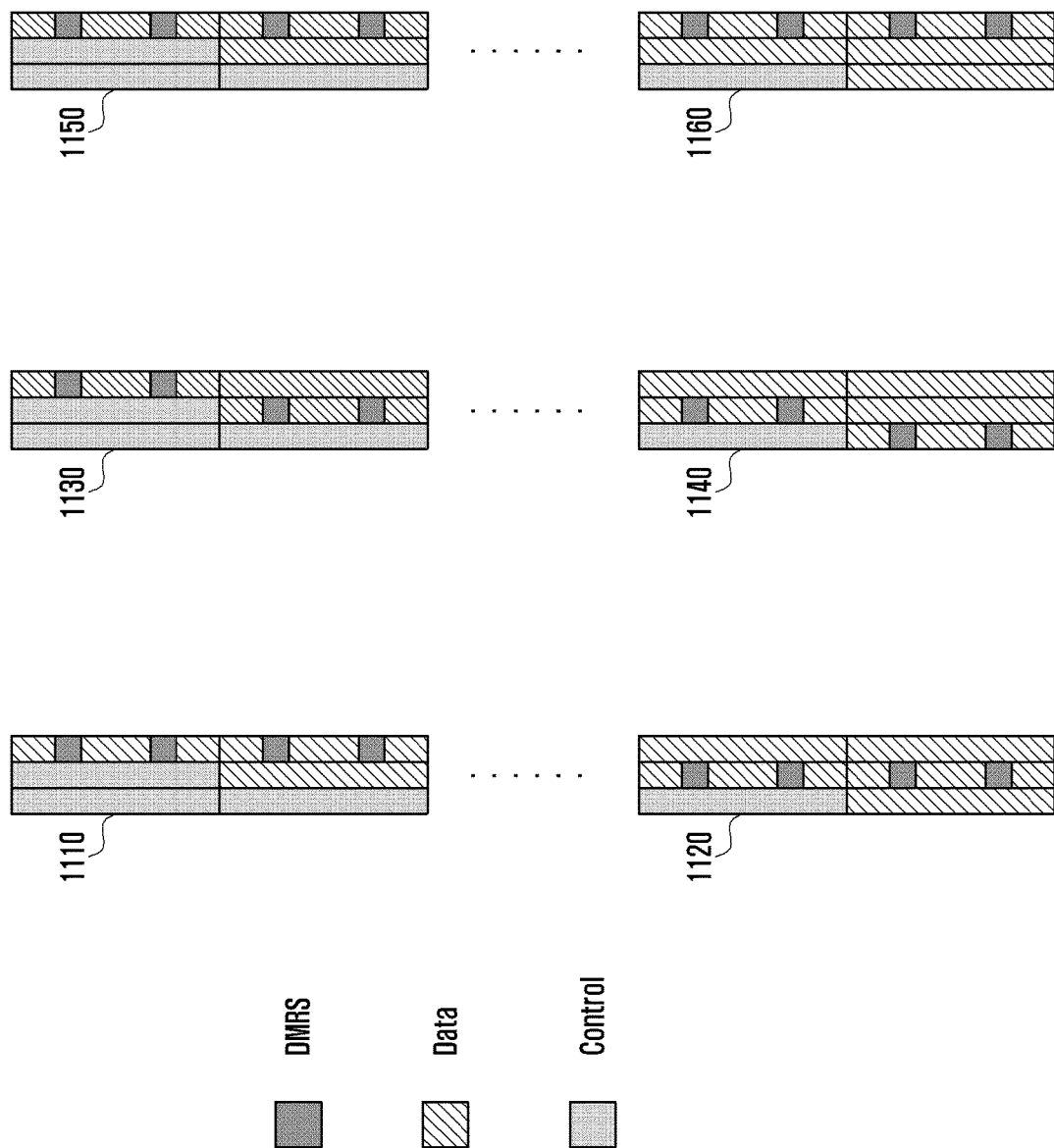
FIG. 11 is a diagram explaining a method for configuring a DMRS position by control format indicator (CFI) and slot symbol durations according to an embodiment of the disclosure.

FIG. 11 is a diagram explaining a method for configuring a DMRS position by CFI and slot symbol durations according to an embodiment of the disclosure.

More specifically, the Alt-2 method will be described in more detail through FIG. 11. An example of a slot structure composed of 3 OFDM symbols is illustrated in FIG. 11, and DMRS, data, and control channel are illustrated with different colors. In case of the first method, since the position of the front-loaded DMRS is determined according to the CFI configured in the CORESET, it is possible to configure the DMRS position maximally next to a control channel. As illustrated as 1110 and 1120 of FIG. 11, 1110 illustrates a DMRS configuration position according to the first method in case where the CFI value configured in the CORESET is 2, and 1120 illustrates a DMRS configuration position in case where the CFI value configured in the CORESET is 1. If the DMRS can be positioned further on the front side through signaling of PDSCH start position information or additional configuration, as illustrated as 1130 and 1140, the DMRS position is configured further on the front side to further minimize the latency. In this case, the DMRS position may be determined by granularity for the data starting position on the frequency axis. For example, through configuration of the DMRS position in the unit of a resource block group (RBG), multiple RBGs, a bandwidth part (subband), or a PRB level, it is possible to more effectively operate the data scheduling and DMRS channel estimation.

The second method using Equation 2 is determined in consideration of all configurable values for the CFI value. In case of using this method, the position of the front-loaded DMRS may be fixed regardless of the start position of the PDSCH even with respect to the non-basic slot. For example, as illustrated as 1150 and 1160, in case where the CFI value of the 1150 region is 2 and the CFI value of the 1120 region is 1, the position of the front-loaded DMRS may be determined as the third OFDM symbol in consideration of the max value of the two values. In case of the disclosed Alt-2, the DMRS position is determined by the max value of the CFI, and thus the frequency of the DMRS position change may be small. As described above in the first embodiment, if the CFI information is semi-statically configured, the frequency of the DMRS position change may become smaller.

Although the DMRS position has been provided around DL, it is possible to configure the DMRS in the same position even with respect to UL in order for DL and UL to support a common DMRS structure. If the DL and UL have the common DMRS structure, it may be easy to control interference through orthogonal DMRS port allocation between UL and DL in an environment such as a dynamic TDD.

Fourth Embodiment

In a fourth embodiment, a method for determining a DMRS position in a basic slot structure in which DL and UL exist at the same time will be described. In the first embodiment, the following case is defined as a basic slot based on 3GPP RAN1 #86bis agreement.

For SCS of up to 60 kHz with NCP, y=7 and 14
FFS: whether/which to down select for certain SCS(s)
For SCS of higher than 60 kHz with NCP, y=14

According to the first embodiment, with respect to a case where a subcarrier interval is equal to or smaller than 60 kHz, the length of a basic slot may be configured as y=7 or y=14. Further, with respect to a case where the subcarrier interval is larger than 60 kHz, the length of the basic slot may be configured as y=14. According to the agreement, the slot length y may be defined to include all of DL centric/DL only/UL centric/UL only structures basically possible in the 5G NR communication system. Accordingly, in the DL centric or UL centric structure in which DL and UL exist at the same time, due to the DL/UL symbol length and GP influence, the DMRS position may be configured differently from the DL only or UL only structure. For the same reason, in the fourth embodiment, a method for determining a DMRS position with respect to a basic slot structure in which DL and UL exist at the same time is provided.

Figure 12:
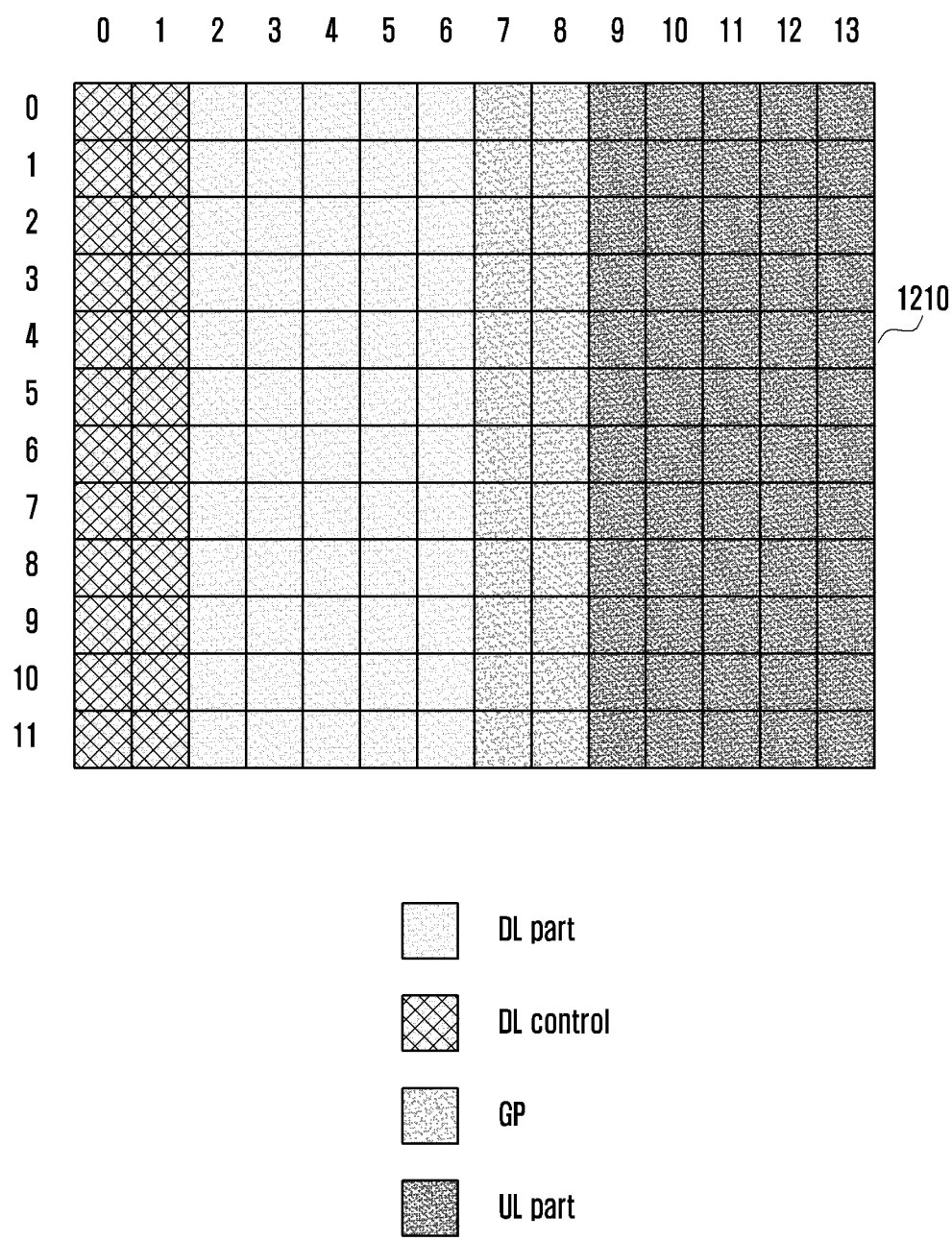
FIG. 12 is a diagram illustrating a basic slot structure in which DL and UL exist at the same time according to an embodiment of the disclosure.

FIG. 12 is a diagram illustrating a basic slot structure in which DL and UL exist at the same time, according to an embodiment of the disclosure.

More specifically, FIG. 12 illustrates a basic slot structure 1210 in which DL and UL exist at the same time. Referring to FIG. 12, DL, GP, and UL are illustrated with different colors. In this case, the position of the front-loaded DMRS may be configured in the same method as the method of Equation 1 according to the first embodiment, or may be configured through Equation 2 according to the third embodiment. In the first, second, and third embodiments, it is possible to configure the UL DMRS position in the same position as the position of the DL DMRS position on the assumption of the DL only or UL only structure. However, in the DL centric or UL centric structure in which DL and UL exist at the same time, regions occupied by DL/GP/UL may differ from each other, and thus such configuration may be difficult. Accordingly, it is proposed to determine the position of the front-loaded DMRS for UL based on the GP as in the following equation.

The last symbol position for GP+1    Equation 3

According to Equation 3, "the last symbol position for GP" in FIG. 12 becomes 8, and the position of the front-loaded DMRS for UL may start from 9.

Figure 13:
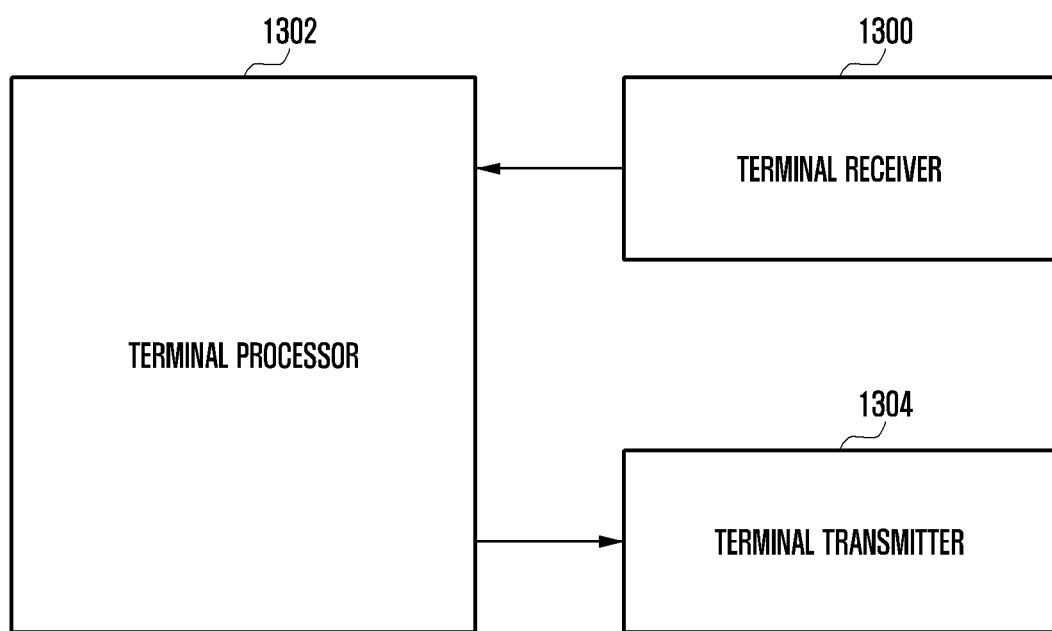
FIG. 13 is a block diagram illustrating an internal structure of a terminal according to an embodiment of the disclosure.
Figure 14:
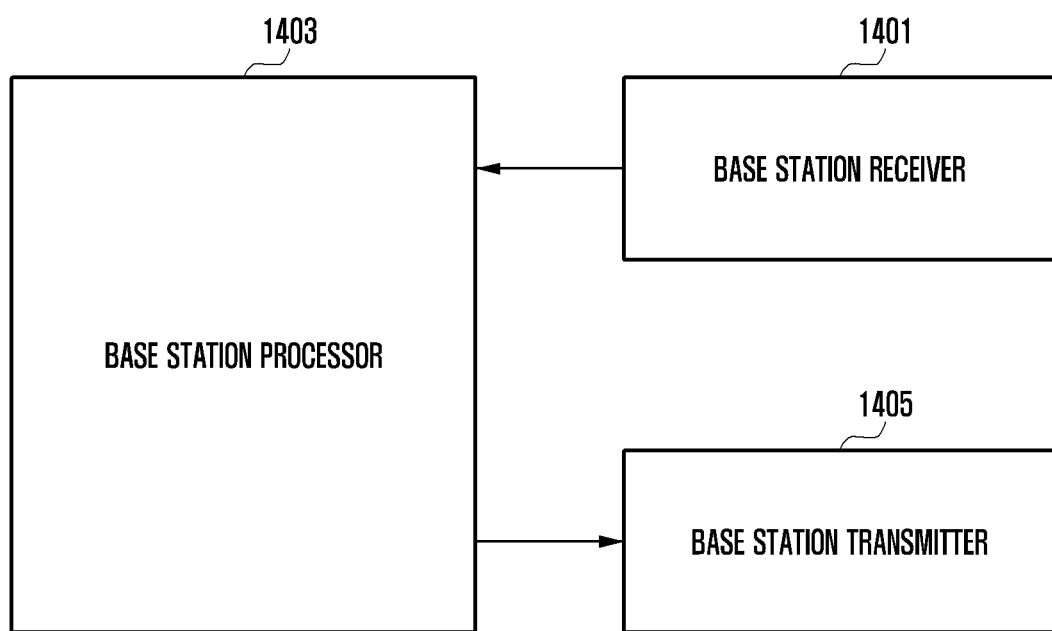
FIG. 14 is a block diagram illustrating an internal structure of a base station according to an embodiment of the disclosure.

In order to perform the above-described embodiments of the disclosure, a transmitter, a receiver, and a processor of a terminal or a BS are illustrated in FIGS. 13 and 14. According to the first to fourth embodiments, a method for configuring a DMRS position and a transmission/reception method between a BS and a terminal are described, and for this, the receiver, the processor, and the transmitter of the BS or the terminal should operate according to the respective embodiments.

FIG. 13 is a block diagram illustrating an internal structure of a terminal according to an embodiment of the disclosure.

Referring to FIG. 13, a terminal according to the disclosure may include a terminal receiver 1300, a terminal transmitter 1304, and a terminal processor 1302. In an embodiment of the disclosure, the terminal receiver 1300 and the terminal transmitter 1304 may be commonly called a transceiver. The transceiver may transmit/receive a signal with a BS. The signal may include control information and data. For this, the transceiver may be composed of an RF transmitter for up-converting and amplifying the frequency of a transmitted signal, and an RF receiver for low-noise-amplifying and down-converting the frequency of a received signal. Further, the transceiver may receive a signal through a radio channel, and may output the received signal to the terminal processor 1302. The transceiver may also transmit the signal that is output from the terminal processor 1302 through the radio channel. The terminal processor 1302 may control a series of processes for the terminal operation according to the above-described embodiment of the disclosure. For example, the terminal receiver 1300 may receive a reference signal from the BS, and the terminal processor 1302 may control to analyze a method for applying the reference signal. Further, the terminal transmitter 1304 may also transmit the reference signal.

FIG. 14 is a block diagram illustrating an internal structure of a BS according to an embodiment of the disclosure.

Referring to FIG. 14, a BS according to an embodiment of the disclosure may include a BS receiver 1401, a BS transmitter 1405, and a BS processor 1403. In an embodiment of the disclosure, the BS receiver 1401 and the BS transmitter 1405 may be commonly called a transceiver. The transceiver may transmit/receive a signal with a terminal. The signal may include control information and data. For this, the transceiver may be composed of an RF transmitter for up-converting and amplifying the frequency of a transmitted signal, and an RF receiver for low-noise-amplifying and down-converting the frequency of a received signal. Further, the transceiver may receive a signal through a radio channel, and may output the received signal to the BS processor 1403. The transceiver may also transmit the signal that is output from the BS processor 1403 through the radio channel. The BS processor 1403 may control a series of processes for the BS operation according to the above-described embodiment. For example, the BS processor 1403 may control to determine the structure of a reference signal and to generate configuration information of the reference signal to be transferred to the terminal. Thereafter, the BS transmitter 1405 may transfer the reference signal and the configuration information to the terminal, and the BS receiver 1401 may also receive the reference signal.

Further, according to an embodiment of the disclosure, the BS processor 1403 may process DMRS position configuration. Further, the BS transmitter 1405 may transfer information required for this to the terminal.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a terminal in a wireless communication system, the method comprising:
    receiving, on a physical broadcast channel (PBCH), a master information block (MIB) including information for a position of a first demodulation reference signal (DMRS);
    identifying a mapping type for a uplink from a first mapping type for the uplink and a second mapping type for the uplink;
    in case that the mapping type for the uplink is the first mapping type for the uplink, transmitting a first DMRS on a third symbol or a fourth symbol of a slot in the uplink based on the information for the position of the first DMRS included in the MIB; and
    in case that the mapping type for the uplink is the second mapping type for the uplink, transmitting a first DMRS on a first symbol of a scheduled uplink data resource.

2. The method of claim 1, further comprising:
    in case that the mapping type for the uplink is the first mapping type for the uplink and one additional DMRS for the uplink is configured by a higher layer signalling, transmitting the additional DMRS for the uplink on a twelfth symbol of the slot of duration in 14 symbols.

3. The method of claim 1, further comprising:
    in case that the mapping type for the uplink is the first mapping type for the uplink and three additional DMRSs for the uplink are configured by a higher layer signalling, transmitting the additional DMRSs on sixth symbol, ninth symbol and twelfth symbol of the slot of duration in 14 symbols.

4. The method of claim 1, further comprising:
    identifying a mapping type for a downlink from a first mapping type for the downlink and a second mapping type for the downlink;
    in case that the mapping type for the downlink is the first mapping type for the downlink, receiving a first DMRS on a third symbol or a fourth symbol of a slot in the downlink based on the information for the position of the first DMRS included in the MIB;
    in case that the mapping type for the downlink is the second mapping type for the downlink, receiving a first DMRS on a first symbol of a scheduled downlink data resource; and
    in case that the mapping type for the downlink is the first mapping type for the downlink and three additional DMRSs for the downlink are configured by a higher layer signalling, determining that the additional DMRSs for the downlink are positioned on sixth symbol, ninth symbol and twelfth symbol of the slot of duration in 14 symbols, and receiving the additional DMRSs for the downlink on the determined position.

5. The method of claim 4, wherein the receiving the first DMRS on the first symbol of the scheduled downlink data resource further comprising:
    in case that the mapping type for the downlink is the second mapping type for the downlink and a control region resource (CORESET) is configured, receiving the first DMRS on a first symbol after the CORESET.

6. A method of a base station in a wireless communication system, the method comprising:
    transmitting, on a physical broadcast channel (PBCH), a master information block (MIB) including information for a position of a first demodulation reference signal (DMRS); and
    receiving a first DMRS in an uplink from a terminal,
    wherein a position for the first DMRS in the uplink is determined on a third symbol or a fourth symbol of a slot based on the information for the position of the first DMRS included in the MIB, in case that a mapping type for a uplink is a first mapping type for the uplink, and
    wherein the position for the first DMRS in the uplink is determined on a first symbol of a scheduled uplink data resource, in case that the mapping type for the uplink is a second mapping type for the uplink.

7. The method of claim 6, further comprising:
    in case that the mapping type for the uplink is the first mapping type for the uplink and one additional DMRS for the uplink is configured by a higher layer signalling, receiving the additional DMRS for the uplink on a twelfth symbol of the slot of duration in 14 symbols.

8. The method of claim 6, further comprising:
    in case that the mapping type for the uplink is the first mapping type for the uplink and three additional DMRSs for the uplink are configured by a higher layer signalling, receiving the additional DMRSs on sixth symbol, ninth symbol and twelfth symbol of the slot of duration in 14 symbols.

9. The method of claim 6, further comprising:
    in case that a mapping type for a downlink is a first mapping type for the downlink, transmitting a first DMRS on a third symbol or a fourth symbol of a slot in the downlink based on the information for the position of the first DMRS included in the MIB;
    in case that the mapping type for the downlink is a second mapping type for the downlink, transmitting a first DMRS on a first symbol of a scheduled downlink data resource;
    transmitting information on an additional DMRS for the downlink on a higher layer signalling; and
    in case that the mapping type for the downlink is the first mapping type for the downlink and three additional DMRSs for the downlink are configured based on the information on the additional DMRS for the downlink, transmitting the additional DMRSs for the downlink on sixth symbol, ninth symbol and twelfth symbol of the slot of duration in 14 symbols.

10. The method of claim 9, wherein the transmitting the first DMRS on the first symbol of the scheduled downlink data resource further comprising:
    in case that the mapping type for the downlink is the second mapping type for the downlink and a control region resource (CORESET) is configured, transmitting the first DMRS on a first symbol after the CORESET.

11. A terminal in a wireless communication system, the terminal comprising:
    a transceiver; and at least one processor configured to:
receive, on a physical broadcast channel (PBCH) via the transceiver, a master information block (MIB) including information for a position of a first demodulation reference signal (DMRS),
identify a mapping type for a uplink from a first mapping type for the uplink and a second mapping type for the uplink,
in case that the mapping type for the uplink is the first mapping type for the uplink, transmit a first DMRS on a third symbol or a fourth symbol of a slot in the uplink based on the information for the position of the first DMRS included in the MIB, and
in case that the mapping type for the uplink is the second mapping type for the uplink, transmit a first DMRS on a first symbol of a scheduled uplink data resource.

12. The terminal of claim 11, wherein the at least one processor further configured to:
in case that the mapping type for the uplink is the first mapping type for the uplink and one additional DMRS for the uplink is configured by a higher layer signalling, transmit the additional DMRS for the uplink on a twelfth symbol of the slot of duration in 14 symbols.

13. The terminal of claim 11, wherein the at least one processor further configured to:
in case that the mapping type for the uplink is the first mapping type for the uplink and three additional DMRSs for the uplink are configured by a higher layer signalling, transmit the additional DMRSs on sixth symbol, ninth symbol and twelfth symbol of the slot of duration in 14 symbols.

14. The terminal of claim 11, wherein the at least one processor further configured to:
identify a mapping type for a downlink from a first mapping type for the downlink and a second mapping type for the downlink;
in case that the mapping type for the downlink is the first mapping type for the downlink, receive a first DMRS on a third symbol or a fourth symbol of a slot in the downlink based on the information for the position of the first DMRS included in the MIB;
in case that the mapping type for the downlink is the second mapping type for the downlink, receive a first DMRS on a first symbol of a scheduled downlink data resource; and
in case that the mapping type for the downlink is the first mapping type for the downlink and three additional DMRSs for the downlink are configured by a higher layer signalling, determine that the additional DMRSs for the downlink are positioned on sixth symbol, ninth symbol and twelfth symbol of the slot of duration in 14 symbols, and receive the additional DMRSs for the downlink on the determined position.

15. The terminal of claim 14, wherein the at least one processor further configured to:
in case that the mapping type for the downlink is the second mapping type for the downlink and a control region resource (CORESET) is configured, receive the first DMRS on a first symbol after the CORESET.

16. A base station in a wireless communication system, the base station comprising:
a transceiver; and
at least one processor configured to:
transmit, on a physical broadcast channel (PBCH) via the transceiver, a master information block (MIB) including information for a position of a first demodulation reference signal (DMRS), and
receive a first DMRS in an uplink from a terminal,
wherein a position for the first DMRS in the uplink is determined on a third symbol or a fourth symbol of a slot based on the information for the position of the first DMRS included in the MIB, in case that a mapping type for a uplink is a first mapping type for the uplink, and
wherein the position for the first DMRS in the uplink is determined on a first symbol of a scheduled uplink data resource, in case that the mapping type for the uplink is a second mapping type for the uplink.

17. The base station of claim 16, wherein the at least one processor further configured to:
in case that the mapping type for the uplink is the first mapping type for the uplink and one additional DMRS for the uplink is configured by a higher layer signalling, receive the additional DMRS for the uplink on a twelfth symbol of the slot of duration in 14 symbols.

18. The base station of claim 16, wherein the at least one processor further configured to:
in case that the mapping type for the uplink is the first mapping type for the uplink and three additional DMRSs for the uplink are configured by a higher layer signalling, receive the additional DMRSs on sixth symbol, ninth symbol and twelfth symbol of the slot of duration in 14 symbols.

19. The base station of claim 16, wherein the at least one processor further configured to:
in case that a mapping type for a downlink is a first mapping type for the downlink, transmit a first DMRS on a third symbol or a fourth symbol of a slot in the downlink based on the information for the position of the first DMRS included in the MIB;
in case that the mapping type for the downlink is a second mapping type for the downlink, transmit a first DMRS on a first symbol of a scheduled downlink data resource;
transmit information on an additional DMRS for the downlink on a higher layer signalling; and
in case that the mapping type for the downlink is the first mapping type for the downlink and three additional DMRSs for the downlink are configured based on the information on the additional DMRS for the downlink, transmit the additional DMRSs for the downlink on sixth symbol, ninth symbol and twelfth symbol of the slot of duration in 14 symbols.

20. The base station of claim 19, wherein the at least one processor further configured to:
in case that the mapping type for the downlink is the second mapping type for the downlink and a control region resource (CORESET) is configured, transmit the first DMRS on a first symbol after the CORESET.

* * * * *